(12) United States Patent
Herz et al.

(10) Patent No.: US 6,571,279 B1
(45) Date of Patent: May 27, 2003

(54) LOCATION ENHANCED INFORMATION DELIVERY SYSTEM

(75) Inventors: Fredrick Herz, Warrington, PA (US); Jonathan M. Smith, Princeton, NJ (US); David C. Parkes, Philadelphia, PA (US)

(73) Assignee: Pinpoint Incorporated, TX (US)

(*) Notice: Subject to any disclaimer, the term of this patent is extended or adjusted under 35 U.S.C. 154(b) by 0 days.

(21) Appl. No.: 09/314,321

(22) Filed: May 19, 1999

Related U.S. Application Data

(63) Continuation-in-part of application No. 09/024,278, filed on Feb. 17, 1998, and a continuation-in-part of application No. 08/985,731, filed on Dec. 5, 1997, now Pat. No. 6,029,195.

(51) Int. Cl.[7] .............................................. G06F 15/16
(52) U.S. Cl. ...................... 709/217; 709/219; 709/203; 707/10
(58) Field of Search ................................ 709/246, 203, 709/201, 217, 224, 226, 229, 202, 219, 225; 707/10

(56) References Cited

U.S. PATENT DOCUMENTS

| | | | |
|---|---|---|---|
| 4,853,678 A | | 8/1989 | Bishop, Jr. et al. ......... 340/573 |
| 5,613,209 A | * | 3/1997 | Peterson et al. ............ 455/518 |
| 5,642,484 A | | 6/1997 | Harrison, III et al. ...... 395/214 |
| 5,754,938 A | * | 5/1998 | Herz et al. .................... 705/74 |
| 5,754,939 A | * | 5/1998 | Herz et al. ................. 455/3.04 |
| 5,855,008 A | | 12/1998 | Goldhaber et al. ........... 705/14 |
| 6,014,090 A | * | 1/2000 | Rosen et al. ................. 340/905 |
| 6,047,327 A | * | 4/2000 | Tso et al. ..................... 709/232 |
| 6,052,064 A | * | 4/2000 | Budnik et al. .............. 340/7.24 |
| 6,154,745 A | * | 11/2000 | Kari et al. ................... 707/100 |
| 6,381,465 B1 | * | 4/2002 | Chern et al. ................. 455/466 |
| 6,456,852 B2 | * | 9/2002 | Bar et al. .................... 455/456 |

FOREIGN PATENT DOCUMENTS

| | | | |
|---|---|---|---|
| EP | 0700226 A2 | 3/1996 | ............ H04Q/7/28 |
| WO | WO 94/11967 | 5/1994 | ............ H04J/3/16 |
| WO | WO 97/41654 | 11/1997 | ............ H04H/1/00 |
| WO | WO 99/30273 | 6/1999 | .......... G06K/15/00 |
| WO | WO 00/04730 | 1/2000 | ............ H04Q/7/00 |

OTHER PUBLICATIONS

International Search Report for PCT Application No. PCT/US00/13858 dated Feb. 14, 2001.

* cited by examiner

Primary Examiner—Mehmet B. Geckil
(74) Attorney, Agent, or Firm—Melvin A. Hunn

(57) ABSTRACT

The Location Enhanced Information Deliver System Architecture (LEIA) customizes the information that is displayed to an information recipient based on optimizing a match between information purveyors, such as advertisers, and the information recipients who are local to an information delivery system. The present location enhanced information delivery system presents the information most suited to the real current audience, as measured by location information systems, rather than to a static predicted audience. While the preferred embodiment discloses a beaconing-style wireless technology, the system concept is easily extensible both to other location-information systems, such as license-plate scanning with cameras, and to utilizing the location-information for private displays of information in addition to public displays of information.

96 Claims, 2 Drawing Sheets

LOCATION ENHANCED INFORMATION DELIVERY SYSTEM

CROSS-REFERENCE TO RELATED APPLICATIONS

This application is a continuation-in-part of U.S. patent application Ser. No. 09/024,278 filed Feb. 17, 1998, titled "Broadcast Data Distribution System with Asymmetric Uplink/Downlink Bandwidths" and is a continuation of U.S. patent application Ser. No. 08/985,731 filed Dec. 9, 1998, titled "System for Customized Electronic Identification of Desirable Objects" now U.S. Pat. No. 6,029,195.

FIELD OF THE INVENTION

This invention relates to information delivery systems and, in particular, to a system for customizing the information that is displayed to a viewer based on optimizing a match between information purveyors, such as advertisers, and the viewer in a manner that is executed local to an information delivery system.

Problem

It is a problem in information delivery systems to provide an information recipient with information that is pertinent to the recipient. This entails determining a match between information purveyors, such as advertisers, and the information recipient such that the information that is provided to the information recipient is desired by the information recipient and pertinent to the needs of the information recipient. Existing information delivery systems are based on static predictions of likely audiences, such as profiles of information recipients for different time periods of television broadcasts or in-store advertisements directed to a typical customer. These information delivery systems are static in nature in that they do not change in response to changes in the information receiving audience that they serve. Even in the context of systems such as the World-Wide Web, systems use stale aggregates to make speculative decisions. Therefore, existing information delivery systems are limited in their effectiveness in providing relevant information to their target audiences, since the defined target audiences represent a simple approximation of the ever changing actual audience.

Solution

The above described problems are solved and a technical advance achieved by the Location Enhanced Information Delivery System (LEIA) which customizes the information that is displayed to an information recipient based on optimizing a match between information purveyors, such as advertisers, and the information recipients who are local to an information delivery system. The present location enhanced information delivery system presents the information most suited to the real current audience, as measured by location information systems, rather than to a static predicted audience. While the preferred embodiment discloses a beaconing-style wireless technology, the system concept is easily extensible both to other location-information systems, such as license-plate scanning with cameras, and to utilizing the location-information for private displays of information in addition to public displays of information.

The location enhanced information delivery system can be supported with conventional or advanced networking infrastructures. One example of an advanced networking infrastructure appropriate for the location enhanced information delivery system is the asymmetric bandwidth channel network disclosed in co-pending U.S. patent application Ser. No. 09/024,278, titled "Broadcast Data Distribution System With Asymmetric Uplink/Downlink Bandwidths" that provides a reduced memory architecture for network-attached elements. The location enhanced information delivery system can also utilize the information similarity measurement technologies disclosed in U.S. Pat. No. 5,754,939, titled "System for Generation of User Profiles for a System for Customized Electronic Identification of Desirable Objects" as a means of enhancing pre-fetching of information likely to be needed, with a consequent reduction in network bandwidth required to support the location enhanced information delivery system. The location enhanced information delivery system can protect users identities using a pseudonymity proxy server disclosed in U.S. Pat. No. 5,754,938 titled "Pseudonymous Server for System for Customized Electronic Identification of Desirable Objects". An additional advantage for public information-delivery capability of the location enhanced information delivery system is in its environment-friendliness, as the location enhanced information delivery system can determine when zero information recipients are local and turn off the display, resulting in a significant energy savings during idle periods.

DETAILED DESCRIPTION

Definitions

Figure 1:
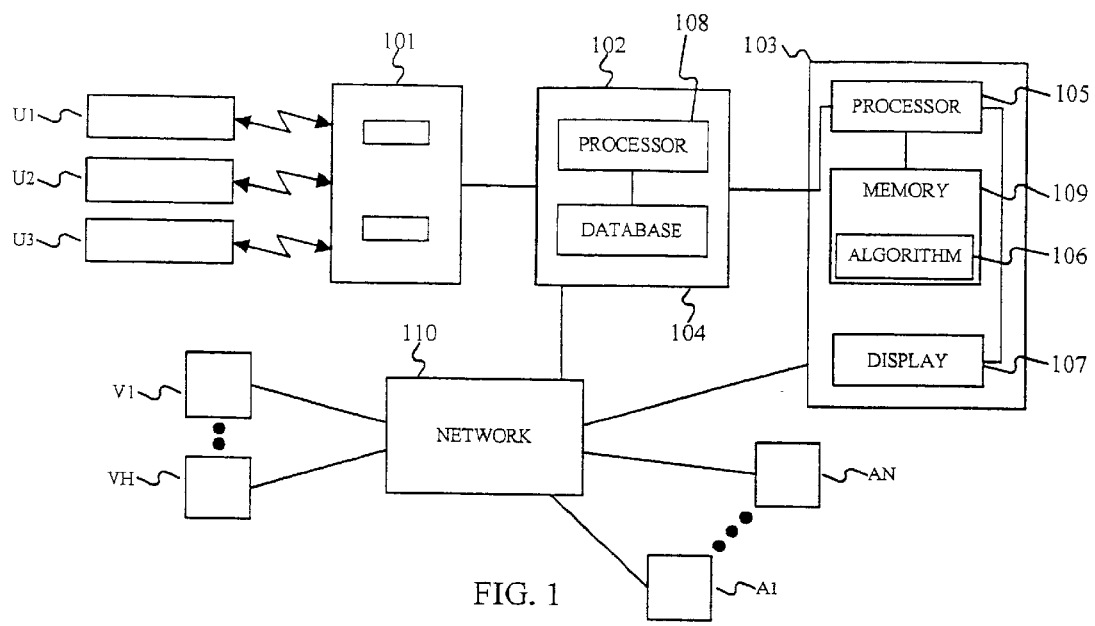
FIG. 1 illustrates in block diagram form the location enhanced information delivery system.

Relevant definitions of terms for the purpose of this description include: (a) an object available for access by the user, which may be either physical or electronic in nature, is termed "target object," (b) a digitally represented profile indicating that target object's attributes, is termed "target profile," (c) the information recipient who is looking for the target object, is termed "user," (d) a profile holding that user's attributes, is termed "user profile," (e) a summary of digital profiles of target objects that a user likes and/or dislikes, is termed the "target profile interest summary" of that user, (f) a collection of target objects with similar profiles, is termed a "cluster," (g) an aggregate profile formed by averaging the attributes of all target objects in a cluster, is termed a "cluster profile."

Wireless Communication

The advent of mobile wireless communication, in the form of pagers, cellular phones, and the like, has made on-demand location-independent communication possible. Many of these wireless technologies provide the ability to locate the call originating or receiving wireless subscriber station, via the unique terminal identifiers used for authentication and billing. Some of these wireless systems incorporate precise location determining apparatus, such as Global Positioning Systems. Except for a few examples, such as the Active Badge technology developed by the Olivetti Research Lab in Cambridge, UK, very little use has been made of the information that relates to the location of the wireless subscriber station, other than for locating the message/call destination as part of the wireless communication service. The Active Badge is very low power and intended for enclosed environments of small geographic scope, such as in a set of offices or on a campus site. The Active Badge technology has been used for tasks such as automatically opening door locks and automatic location of Active Badge wearers. The present location enhanced information delivery system provides a novel means of integrating subscriber location information into the design of advanced communication services.

Cellular Telephony

Cellular telephone systems are one example of wireless communication systems. The cellular telephone system divides the service area into "cells," in which the assigned radio spectrum is channeled in some fashion using digital or analog technology. Each cell is provided with a base station to which mobile subscriber stations connect to make a wireless communication connection. The handoff of a communication connection that exists between a mobile subscriber station and a base station to another base station entails executing the steps of: establishing a wireless communication connection from the mobile subscriber station to the base station in the cell into which the mobile subscriber station is about to enter, transitioning the existing wireless communication connection to the new wireless communication connection, and then releasing the old wireless communication connection. The mobile subscriber stations are interconnected with the traditional telephony infrastructure, and thus ubiquitous cellular service can be achieved by the provision of sufficient base stations. The mobile subscriber stations periodically emit an identifying token, so that the base station knows they are present in the service area of the base station. This same beaconing behavior can be exploited to construct the location enhanced information delivery system, because while it is low-cost and requires low bandwidth, it can be integrated with sophisticated delivery systems to provide customizable information to the mobile subscriber station.

Classic cellular telephony[x,y] is based on the use of a set of radio frequencies chosen from a set (a "band" of spectrum), two of which are required per connection (one to send, the other to receive). These frequencies are required during a call, but otherwise not used, so that many cellular telephones can be present in a "cell" but only the active telephones consume frequencies. "Cells" are regions where selected sets of radio frequencies are in use. Adjacent cells do not use the same frequencies for calls to prevent interference. Cells are often arranged as hexagons since hexagons "tile" the plane.

Calls are set up and handed-across cell boundaries using a signaling channel. The signaling channel uses a common protocol which all cell phones understand, Signaling System 7 (SS7). The handset periodically broadcasts a unique identifier (which in the telephone system, maps directly to a telephone number) which is "burned in" to a chip in the telephone. This number is used by the base station for the cell to identify the phone for billing purposes, and to find its "home location". When a cellular telephone enters a base station's cell, the base station uses the ID to find its home Mobile Telephone Switching Office (MTSO), from which calls appear to be traveling to and from as they are made (an interesting consequence is that a New Jersey cellular telephone operating in California will route a call to the East Coast and back, even for a location a block away). The channel between the local Mobile Telephone Switching Office and the home Mobile Telephone Switching Office is carried over the traditional telephone network (e.g., landlines). When moving between cells, the telephone and two base stations use a handoff protocol so that the connection is maintained; it essentially involves setting up frequencies in the destination cell to switch to. Handoff is triggered when the telephone detects two "beacons" of approximately equal strength; each base station emits a beacon (like a radio "lighthouse") so that it can be detected.

The location enhanced information delivery system 100 uses similar mechanisms for location tracking—in fact, one attractive implementation technology for tracking in the location enhanced information delivery system 100 is the telephone number emitted by the cellular handset. Where the cellular network uses the local Mobile Telephone Switching Office as a dumb proxy to the home Mobile Telephone Switching Office via telephone circuits, the location enhanced information delivery system 100 use of a profile fetched from one or more locations, coupled with information from a multiplicity of sources, provides a much richer source of information than a call acceptance decision. The use of this information at the location(s) where the location enhanced information delivery system 100 location ID is detected is much richer, because the use of the information is location-customized, e.g., to a billboard, kiosk, proximity to a vendor, etc. The cellular handset provides the same service everywhere (in fact, that is one of its appeals), which is a telephone circuit.

The integration of the location enhanced information delivery system 100 with the telephony infrastructure provides a junction point for information analysis systems. The beacon capability of the mobile subscriber stations can be used to identify a user, and using this subscriber identification information, to locate and fetch a user profile for the identified subscrber. Simplistic user profiles have been used as part of Personal Communication Service systems, primarily to reduce traffic loads on the network, to reduce the radio bandwidth used, and the traffic load on the SS7 signaling network.

Use of Profile Databases

The present location enhanced information delivery system represents an advance both in the use of location-tracking as part of an information-delivery architecture, and in the use of advanced user profiles which can be coupled with location information and information delivery systems to optimize subscriber customized information delivery to identified subscribers. The user profile can be used as part of an information customization architecture. The user profile idea is completely general since the user profile can contain information gathered completely automatically, and the user profile can be used for a variety of tasks. Particular examples include:

1. Billboards—The present location enhanced information delivery system can use the user profiles in the automatic selection of information for display on an electronic "billboard" that is located in or on a store, or along a roadway, or along a walkway. If the user profiles contain information about users' buying habits, then the billboard operator can run a voting algorithm on the collected user profiles to determine the characteristics of the present user audience to select a revised set of advertisements to be transmitted to the display. Detailed user location tracking data can be used by a server to preposition advertising on a multitude of billboards based upon user direction of movement and rate of movement calculations. This electronic billboard system represents a novel connection between user location data and the pre-fetching of user information to display user-specific information in the right place at the right time. A key novel feature of the electronic billboard system idea is that when there is an insufficient number of customers in the target audience, the display can be turned off so that the environmental impact of this electronic billboard system is reduced.

2. Unauthorized User Detection—The present location enhanced information delivery system can use correlating information as part of an automatically determined user profile to detect the presence of unauthorized users. This correlating information can be used to compare the user profile against a suspicion threshold to turn on other detectors, such as video cameras. Note that for automobiles only, a completely passive beacon system can be implemented by the automatic detection of license plate numbers on vehicles that are present within the range of operation of this system.

3. Dynamic Marketing of Advertising Capacity—The present location enhanced information delivery system can be managed using advertiser-provided criteria, or location enhanced information delivery system owner provided criteria, such as economic algorithms. For example, given a set of users U(l), l=1, . . . , n, a desirability estimate D(l) for each user U(l) can be estimated, based on such factors as user age group, user income level, geographic closeness of the user U(l) to an advertiser's retail outlet, and the like. For any given interval of time, an advertisement can be selected using the advertiser's price function, P(x), for some x which is a value of the desirability estimates D(l)s. Thus, each advertiser "bids" for the current user profile by specifying the price function P(l); and the price function P(l) is applied to the local users U(l) by computing max(l=1 . . . n) P(D(l)). The use of a bidding algorithm for use of the information display based on customer presence dynamics allows a completely dynamic realtime optimization of information delivery based on revenue.

Pre-Loaded and Pre-Fetched Data

The present location enhanced information delivery system is intended to have associated data storage. This data storage can be used as an effective means of reducing network latencies, increasing the likelihood that user information is appropriate, and reducing network bandwidth. The essential observation is that for each user U(l), l=1, . . . , n, a stored user profile can contain historical information about what the user's interests actually are, rather than purely statistical demographic data. This data might take the form of a list of items purchased, computed from point-of-sale data, a list of web pages examined, from on-line WWW traces, and the like. Similarity metrics can then be used to determine appropriate information to display with greater precision than available from purely demographics-based data. Perhaps most interestingly, the location information can be coupled with geographic information (such as that derived from Global Positioning System receivers) that is accessible to servers, and rates and direction of user motion can be calculated. Thus, an advertisement can be scheduled so that it is visible to a customer during the passage of a particular customer or set of customers past a predefined location. The user movement direction information can be used to ensure that the information selected for display is not based upon the presence of customers who are approaching the display from its back side and therfore cannot view the displayed information.

It is anticipated that user location, direction of movement, and speed of movement can be estimated with sufficient precision to identify individual automobiles which are traveling on a busy highway (at approximately 40–60 foot intervals) so as to target at least one automobile with a customized message which only the targeted automobile(s) is able to see. This is achievable vis a vie the below described techniques for dynamically pre-fetching messages in anticipation of the predicted location of the automobile using the speed vector as calculated through triangulation of its location from two server beacons as the specification herein describes. The display device used to deliver this precise level of targeted methods, is achievable by virtue of an electronic sign board users multi-faced rotating panels (typically rotating on a vertically oriented axis) in which a separate message may be projected by each respective face of the panel in which the face containing the respective customized and message is continuously directed towards the desired target customer in accordance with the customer's movement vector, thus more than one vehicle may be simultaneously targeted with different messages.

User Profiles

A user profile is data that is associated with a particular user. Example data include: user name, user address, number of family members, pet ownership, income ranges, magazine subscriptions, television viewing habits, selected purchasing habits, and the like. For privacy, some of this information might be stored in a statistical aggregate, such as those used to characterize residential areas. These statistical aggregates or detailed data are collected in a user profile which is associated with a user identifier. The user identifier is used as an index (means of selection) to the database of user profiles. User profiles can be maintained by a commercial service for the benefit of advertisers (the way credit card companies utilize customer spending habits to target advertisers) or by the users themselves, as needed. A more detailed description of the user profiles and their generation is disclosed in the above-noted U.S. Pat. No. 5,754,939.

System Overview

The operation of the location enhanced information delivery system as described herein makes use of the fact that each user has a "beacon", which generally serves as a user identification instrumentality. The beacons emit identifiers which can be used to associate users with the detected devices. The beacon can be correlated with location, such as by use of a wireless subscriber station or other systems with known technology. The beacon can be used to access a variety of information in a user-dependent "profile," such as age, income, credit card spending habits, and the like. This user profile can be used as part of an information delivery architecture, in particular it can be used as part of statistical algorithms to customize information display to those users presently located near the display technology.

In FIG. 1, user terminal devices U1–U3 are operational in the service area of location enhanced information delivery system 100, and the location identification devices contained in the. user terminal devices U1–U3 have been detected by a sensor system 101 contained in the location enhanced information delivery system 100. The sensor system 101, in response to detection of the location identification devices contained in the user terminal devices U1–U3, emits Location Identifiers (LIDs) which are passed to a processor 104 which uses the received location identifiers to access database system 102 which maps one or more location identifiers to one or more user identifiers. The user identifiers are emitted to the display subsystem 103, which includes a display processor 105 that executes a display selection algorithm 106 to determine what is displayed on the display device 107. The display selection algorithm 106 may have associated with it an advertiser profile that is used for pricing. While the various elements of display subsystem 103 are illustrated as a single element, the various components may be located remote from the display device 107. In response to the operation of the display selection algorithm 106, the information from the display device 107 can then made available to users U1–U3 or to other users. The display device 107 can in fact be a component of the user terminal device U1–U3, such as the display on a hand-held computer, pager, cellular telephone and the like. The operation of this display subsystem 103 and the associated sensor system 101 is described below. It is envisioned that the location enhanced information delivery system 100 can be an element in a larger information dissemination network, such as that described in the above-noted U.S. Pat. No. 5,754,938 titled "Pseudonymous Server for System for Customized Electronic Identification of Desirable Objects". In this case, the location enhanced information delivery system 100 is a node in that network and retrieves user profile and target profile information as described therein.

Figure 3:
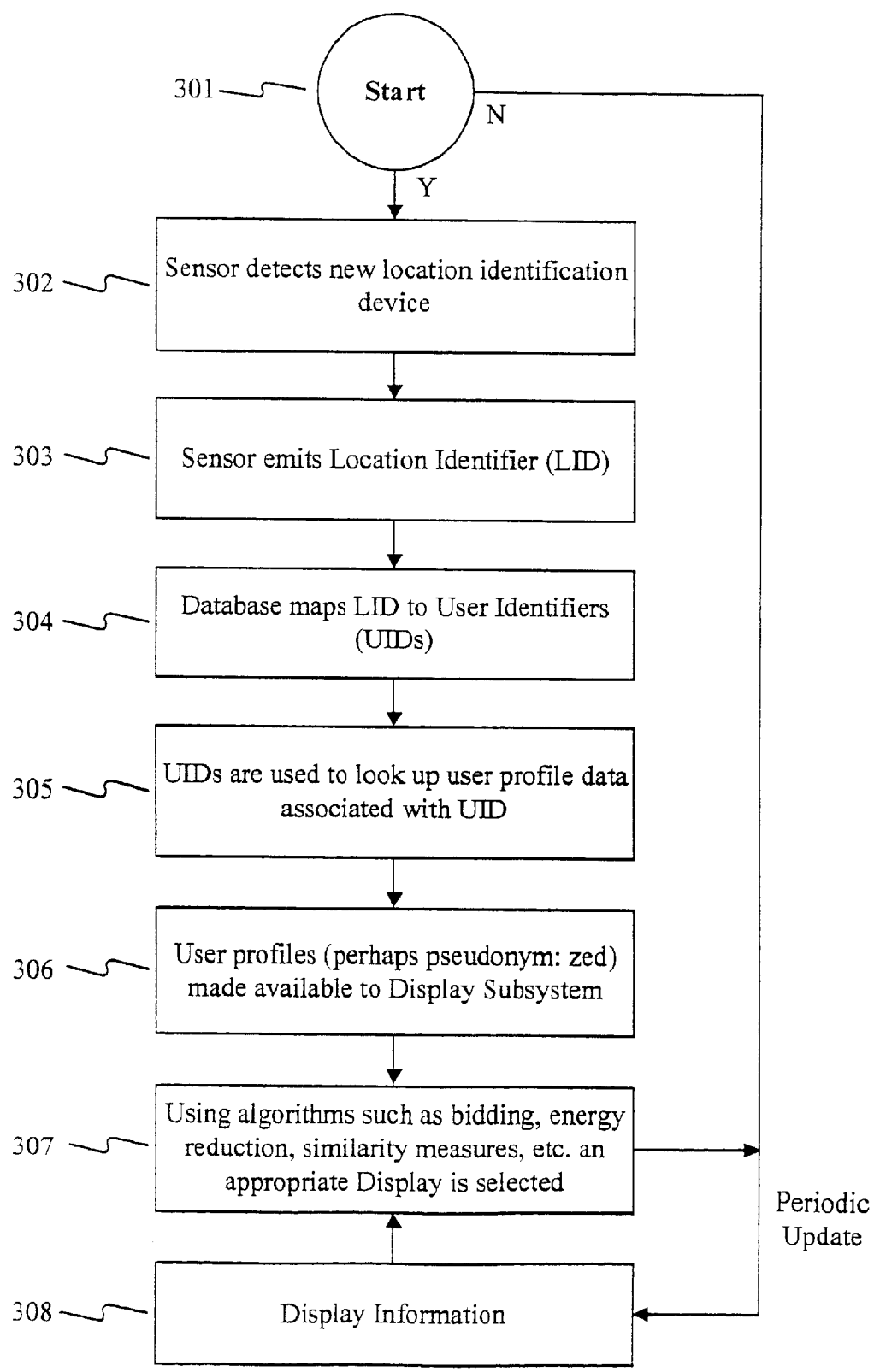
FIG. 3 illustrates in flow diagram form the information flow in the present location enhanced information delivery system.

FIG. 3 illustrates in flow diagram form the typical operation of the location enhanced information delivery system 100. In particular, the process begins at step 301 when the location enhanced information delivery system 100 is initialized. At step 302, one or more of the sensors located in sensor subsystem 101 sense the presence of a user terminal device U2 that is not listed as being present in the predetermined region located around the location enhanced information delivery system 100. The detection is effected by the retrieval of the location identification from the location device in the user terminal device U2. At step 303, the sensor subsystem 101 transmits the determined location identifier to the database processor 108, which at step 304 accesses the database memory 104 to map the received location identification information with a user identifier. The database processor 108 may obtain this information from a remotely located database or from another node in a distributed network. In either case, at step 305, the database processor 108 uses the user identifier to retrieve user profile data that is associated with the user identifier from database memory 104. Again, the database processor 108 may obtain the user profile data from a remotely located database or from another node in a distributed network. The user profile data is then transmitted by database processor 108 to the display subsystem 103 at step 306, with the option that the user profile data is pseudonymized to thereby ensure the privacy of the user. At step 307, the processor 105 located in the display subsystem 103 executes some predetermined algorithm(s) to utilize the user profile data in selecting a display that is most appropriate for this user and/or the collection of users served by display device 107. The results of this processing are used on a periodic basis to update, at step 308, the information presented on the display device 107. Processing returns to step 302 when a new user terminal device enters the space served by the location enhanced information delivery system 100.

Location Identification and Sensing

The architecture of the location enhanced information delivery system 100 presumes that the users' terminal devices U1–U3 provide signals that can be sensed and that the location enhanced information delivery system 100 is able to provide a per-device identifier called a "location identifier". A user terminal device U1, such as a wireless subscriber station, is detected by a user terminal device specific sensor in sensor subsystem 101, which provides a location identifier LID as an output.

Each user with a user identifier has one or more location identifiers LID, which are unique identifiers associated with a specific user terminal device U1 and which can be used to determine a location of the user terminal device U1. Examples of user terminal devices U1 include:—a cellular telephone 13 a PCS telephone—anti-theft devices for automobiles—visually recognizable unique identifiers such as license plates—Global Positioning System (GPS) receiver—Personal CalendarAgent. Each location identifier might be associated with a single user identifier or a small set of user identifiers, as in the case of a user terminal device U1 that is shared among family members. The point of the location identifier is to provide a means of sensing the presence of a user terminal device U1 in a geographic vicinity of the location enhanced information delivery system 100. The presence of the user terminal device U1 in a geographic vicinity can then be used to infer the presence of a user, for which the user identifier is the means of characterizing the user, to the location enhanced information delivery system 100 by indexing a user profile associated with the user. Thus, for each user identifier, there may be multiple location identifiers, and for each location identifier, there may be multiple user identifiers, but in either of these cases, the multiplicity is likely to be extremely small, and perhaps most importantly, the demographic information, of most use to advertisers, is likely to be equivalent across each of multiple user identifiers that are identified by the location enhanced information delivery system 100.

User Identification Retrieval

The user identifiers are used as unique identifiers by the location enhanced information delivery system 100 to obtain information about the user (the "user profile") from one or more information providers, a set which might include commercial enterprises or even the users themselves, as described in the above-noted U.S. Pat. No. 5,754,938. The essential characteristic of the user identifier for the method disclosed here is that it can be used to customize information delivery. Note that the network architecture provides an excellent way for sensor information to be forwarded to a display-controlling server 103, which can then broadcast or multicast information to information display units 107.

Privacy of User Profiles

While the target profile interest summary presents many advantages to both target object providers and users, there are important privacy issues for both users and providers that must be resolved in order for such a system to gain wide acceptance. It is almost a certainty that users desire that some if not all of the user-specific information in their user profiles and target profile interest summaries remain confidential, to be disclosed only under certain circumstances related to certain types of transactions and according to their personal wishes for differing levels of confidentiality regarding their purchases and expressed interests. At the same time, complete and total privacy may not always be desired by all parties to a transaction.

For example, a buyer may desire to be targeted for certain mailings that describe products that are related to his or her interests, and a seller may desire to target users who are predicted to be interested in the goods and services that the seller provides. Indeed, the usefulness of the technology described herein is contingent upon the ability of the system to collect and compare data about many users and many target objects. A compromise between total user anonymity and total disclosure of the user's search profiles or target profile interest summary is a "pseudonym". A pseudonym is an artifact that allows a service provider to communicate with users and maintain records of their preferences, while at the same time remaining ignorant of the users' true identities, so that users can keep their purchases or preferences private.

Note that the integrity of user profiles and target profile interest summaries is important: if a seller relies on target profile interest summary information to deliver promotional offers or other material to a particular class of users, at some cost to the seller, but not to other users, the target profile interest summary information must be accurate and unhampered with in any way. The user may likewise wish to ensure that other parties not tamper with the user's target profile interest summary, since such modification could degrade the system's ability to match the user with appropriate information while protecting the user from inappropriate information.

The approach used in the location enhanced information delivery system provides an improvement over the prior art in privacy-protected pseudonymity for network users that provide a name translator station to act as an intermediary between a service provider and the user. In prior art the information transmitted between the end user U and the service provider is doubly encrypted, and the fact that a relationship exists between user U and the service provider is known to the name translator could be used to compromise user U, for example if the service provider specializes in the provision of content that is not deemed acceptable by user U's peers. This method also omits a method for the convenient updating of pseudonymous user profile information, such as is provided in LEIA, and does not provide for assurance of unique and credentialed registration of pseudonyms from a credentialing agent, or for access control to the user based on profile information and conditional access. Neither does prior art describe any provision for authenticating a user's right to access particular target objects, such as target objects that are intended to be available only upon payment of a subscription fee, or target objects that are intended to be unavailable to younger users.

The location enhanced information delivery system 100 can protect user identities using a pseudonymous proxy server, disclosed in U.S. Pat. No. 5,754,938 titled "Pseudonymous Server for System for Customized Electronic Identification of Desirable Objects". A user can register with a pseudonym validation identifying authority, and receive as many pseudonyms as he/she requires, in order to use a different pseudonym with different groups of vendors. The above referenced patent uses the technique of blind signatures to allow the pseudonym authority to authenticate pseudonyms without receiving disclosure of the pseudonym itself. The user is the only entity in the system with information on his/her portfolio of pseudonyms.

The above referenced patent also teaches a method that can provide guarantees to vendors and information providers that users are legitimately entitled to services, and to authenticate that a user has a "once-in-a-lifetime" pseudonym with a particular vendor. The pseudonym authority can ensure that only a single pseudonym is authenticated for each vendor-user pair, still without knowing the identifier of the pseudonym. The pseudonym authority can check credentials, as signed by credential granting agencies. The uniqueness of pseudonyms is important for the purposes of this application, since the transaction information gathered for a given individual must represent a complete and consistent picture of a single user's activities with respect to a given service provider or coalition of service providers; otherwise, a user's target profile interest summary or user profile would not be able to represent the user's interests to other parties as completely and accurately as possible.

The location enhanced information delivery system 100 allows a given user to use either a single pseudonym in all transactions where the user wishes to remain pseudonymous, or else different pseudonyms for different types of transactions. In the latter case, each service provider might transact with the user under a different pseudonym for the user; more generally, a coalition of service providers who all match users with a particular genre of target objects might agree to transact with the user using a common pseudonym, so that the target profile interest summary associated with that pseudonym would be complete with respect to said genre of target objects. The service provider must have a means of protection from users who violate previously agreed upon terms of service. For example, if a user that uses a given pseudonym engages in activities that violate the terms of service, then the service provider should be able to take action against the user. This type of situation might occur when a user employs a service provider for illegal activities or defaults in payments to the service provider. Likewise, the user may require for his or her own protection that the terms of service include consumer protection remedies, and might, for example, require that any dispute between the service provider and the consumer be referred to an adjudicating agency where the issue may be resolved through arbitration, with the user being represented through his or her pseudonym during the hearing to maintain anonymity throughout the representation.

The beacons that are associated with each user terminal device emit unique location identifiers, that have the potential to allow the privacy of a user's pseudonymity portfolio to be compromised. The location enhanced information delivery system may be extended to support the full privacy functionality of user-managed pseudonyms in a number of ways, including (but not limited to): (a) (at the client level) providing each user terminal with a configurable location identifierthat can emit a unique identifier string for each pseudonym; (b) (at the server level) managing the pseudonym policy of a user at the processor 104, to ensure that a location identifier is mapped not to a user identifier, but the appropriate user pseudonym identifier.

Public Versus Private Displays

Displays can be public or private. Private displays are not intended to be viewed by all of the users U1–U3 in FIG. 1; rather, they are intended to be viewed by other users, say A1–An, who might be advertisers formulating an advertising strategy. Displays might not be intended for local users U1–U3 but rather remotely located users, V1–Vn, who might want to know the current traffic conditions 3 miles ahead or before leaving their driveway. Law enforcement may want to know the sources and destinations of traffic so as to regulate traffic onto or off of thoroughfares. The architecture of the location enhanced information delivery system 100 is completely general in that the display need not be devoted to the uses of the set of local location identifiers, but many of the commercial applications are display oriented.

Information Displays

The location enhanced information delivery system 100 is assumed to contain one or more sensors, one or more processors, and information storage. Sets of sensors might be associated with the display subsystem 103 or a sensor subsystem 101, but a single sensor may be sufficient in some applications. While user profiles and advertiser profiles might be stored locally in memory 104 associated with database 102, it is more typical for them to be remotely accessed through a "distributed access" architecture by which the user profiles are retrieved from an information provider using one or more means of communication, such as data communication network 110. The cost of processors, memory and communications technology have been falling exponentially but display technology costs have not fallen as rapidly, thus the important focus is the declining relative incremental cost of adding processing capability to an information delivery system. While the relative incremental costs of adding processing to the information delivery point approaches zero, the benefits of this addition in terms of value-added are enormous. In particular, the value of the display device for purposes such as advertising are greatly enhanced, particularly when the information delivery device is coupled to associated data, such as user profiles (obtainable via database access) and user locality information (obtainable from the sensor system).

Pricing Information Delivery

Since different user profiles exist for each of the users U1–Un who are in the vicinity of a display device 107 at any one time, and these user profiles vary in ways which attract different levels of interest from advertisers, the current user profile can be offered to advertisers at a time varying price. This general idea is used today, for example by magazines which advertise their reader demographics and circulation. While print media can expand (to print more pages) and keep a constant price, electronic information delivery may be limited by considerations of a finite amount of display time and a finite amount of display screen. Television systems regulate the demand for advertising by means of price, attempting to find a price which clears the demand and exactly fills the allocated advertising time. Thus, more desirable time slots are more expensive. The location enhanced information delivery system 100 can use a bidding algorithm. For each advertiser A(l) an associated "pricing function" P(i,x) is used which, given a demographic profile x, returns a price the advertiser is willing to pay for use of the location enhanced information delivery system 100 to display its advertising. Issued patent "Pseudonymous Server for System for Customized Electronic Identification of Desirable Objects" provides the preferred architectural embodiment suggested for LEIA in which vendors access user profiles and deliver targeted advertising subject to pre-stated conditions and terms set forth typically in advance by the user. The present bidding method would accordingly enhance the value a user and/or electronic display owner receives in exchange for advertising privileges.

The pricing functions P( ) may account for both user type and user count, so that the presence of a large pool of hockey fans at a particular location may not be of interest to one advertiser unless they are also luxury Scotch consumers, while a second advertiser (e.g., a sporting goods store) may be interested in the presence of the hockey fans at a predetermined location purely on user count. For each advertiser A(1)–A(n), its price function P(i,x) is applied to information derived from the user profiles for each of the detected users U(j) at a particular location, such as annual income, geographic locality to a retail outlet of the advertiser's, etc. The advertiser can use any information available, such as time of day (to determine if the advertiser has an outlet open), to determine the bid. The bid is computed and used to control the information delivery device, which rationally selects the highest bidder for any given time period, or can use any other selection algorithm it wishes to employ to control the display; maximizing revenue is expected to be a common choice.

Ecological Information Delivery

We have presumed that the information delivery mechanisms are electronic or electrically powered. One feature of the architecture is the ability to detect the absence of any location identifiers in the geographic vicinity of the display 107. This allows the display device 107 to be dimmed or turned off. Interestingly, no user identifier need be retrieved for this algorithm to work; thus the power-saving algorithm depends only on the presence or absence of detected location identifiers. A simple practical implementation of this idea could use a device similar to a motion sensor to turn a display on or off. Displays the size of billboards consume considerable power in their active operation, and even lit billboards could benefit from location identifier sensing. At the display, the algorithm is: if (number of detected location identifiers <1) display_state=OFF; else display_state=ON; An interesting modification of the algorithm can be made by combining the pricing scheme described in above with the "eco-friendly" idea; if no one is willing to bid the cost of running the display, the display is turned off. Note that this results in exactly the same behavior as the previous algorithm in the face of no detected location identifiers.

x=demographics of current detected location identifiers;

maximum_bid=0; maximum_AID=0;

for (Advertiser l in A(1) . . . A(n))

if(P(i,x))>maximum_bid {maximum_bid=P(i,x);maximum_AID=l;} if(cost(DISPLAY)>maximum_bid)displaystate=OFF;

else {display_state=ON;display_owner=maximum_AID; }.

Exemplary Applications

A) Travel/activities information. This information represents data that is relevant to selected travelers (those actually passing an information display) as they enter a new region or as they physically pass points of (tourist) interest or available activities which are customized to the particular interests of these selected travelers. Present information display systems broadcast information using billboards or an information service on a broadcast radio channel to ALL potential customers without discriminating among the varied interests of these customers.

B) Local News—This information represents data that is important and/or real-time occurring events (formal and even news group related) which are of custom interest to the traveler.

C) Products, services, people of interest plus associated "qualitative" me measures thereof—This information represents data that enables vendors using on-line advertising to also sell off-line as another criterion for estimating their metric of similarity for cross advertising./joint promotions.

D) Retailer's Point-of-Sale System Applications— General retailers today have access to several different channels of information detailing the interaction of shoppers, purchase items, prices and coupons. As previously described, the collaborative filtering system described herein is quite capable of analyzing data gathered through on-line or Web-based retailing channels. However, these same techniques can be applied to more traditional ("off-line") venues of retailing, such as the physical point-of-sale of purchase items. Given that a variety of items can be purchased at the point-of-sale, and that magnetic "shopper loyalty" cards enable vendors to track customers' purchases, the collaborative filtering system can be adapted to a variety of point-of-sale applications. Although it is envisioned mainly as an in-store electronic kiosk, such a system has complex implications and can be used by a vendor as the foundation for a comprehensive retailing strategy, managing everything from the collection of sales data to the designing of promotions. For example, vendors today use the notion of a discount coupon to encourage purchases. These are bulk-mailed to customers or included in newspapers to the general public. Some supermarkets offer point-of-sale discounts to customers who use preferred customer cards at the cash register. While it might prove unsettling at first, the present location enhanced information delivery system 100 allows completely dynamic pricing, for example frequent customer discounts combined with reductions for overstock, etc. These dynamics allow better management of store resources, happier customers, and greater price control.

E. Aggregate User Profile Advertising—In certain situations, where it is impossible to limit the displayed message to a given user, it may be appropriate to combine the profiles of multiple users that view the display, averaging the scores of those common attributes which have scalar values. Examples include: automobiles in which the identity and profile of a user can be inferred only probabilistically—either because a vehicle has multiple users or because multiple automobiles and/or users are in view of a non-rotating panel electronic message board; and the many users that can view an electronic message board that is attached to an aerial blimp or trailing an aircraft.

F. User to User Introductions—In the co-pending patent application System for Automatic Creation of Virtual Communities for System for Customized Electronic Identification of Desirable Objects there is a method which describes how users may be automatically introduced to one another through the identification of common attributes within their user profiles or via browsing or querying a directory of topical interest categories. Accordingly, in the same specification the use of the pseudonym proxy server can also be used to mediate, not only advertiser access to user profiles, but also such access by other users based upon certain guidelines which dictate the terms and conditions by which an individual grants another individual access privileges to gain access to his/her user profile and further possibly introduce him/herself to the user based upon features and/or credentials constituting the user profiles of the requestor. These guidelines constitute part of the requestor's "privacy policy". The location enhanced information delivery system 100 can improve the user-user automatic matching techniques as taught in the aforementioned patent by notifying users of other users that are located in or near the same vicinity and match the desired profile conditions, as consistent with the privacy policies of users, e.g. for purposes of notification, request for electronic introduction and/or delivery of dynamic (actual or pre-formulated) messages the transmission or receipt thereof which may also be subject to conditions as set forth by the other user. Among these messages may be included requests for physical introduction through automatic or manual notification of both parties by one or both parties.

In an extension of the above-referenced patent, user-user matching criteria may be extended to include user profiles based upon a user's demonstrated knowledge or proficiency within a particular topic or domain. Users may be identified as possessing interest (a standard interest-based user profile) in a particular topic as identified through their user profile, or dynamically by having recently submitted a question on the subject to an on-line community of other users. If the knowledge profile of an individual and interest profile of two or more users match, the users may be introduced to one another automatically. LEIA could greatly enhance the ability of complimentary users to be introduced physically and perhaps in some cases, on a dynamic basis.

As suggested in the above patent relating to the Automatic Location of Virtual Communities and elaborated further by U.S. Pat. No. 5,884,270 (Walker et al) users may be introduced to each other based upon privacy policies which control the release of personal data and the reachability of users by other users based upon these policy criteria particularly on a one-to-one basis. U.S. Pat. No. 5,862,223 by the same inventor elaborates upon the particular application of consulting tasks (which typically involve matching of a client with an appropriate expert). LEIA can provide additional advantages to such a system both in being able to identify accesses (experts or clients) which are local to the requester and on mediating implementation of rules which govern the terms and conditions of the introduction, communication (including business terms) between the parties where information as to location proximity of one or both parties is leveraged in order to determine the potential feasibility and associated degree of convenience of a physical meeting.

There are numerous additional applications in which knowledge of location proximity between prospective parties which otherwise meet certain specified criteria for purposes of introduction, task or query, assignment or other applications in which matching similar or appropriately complementary individuals occurs are certainly too numerous to describe. Some are described in pending patent application "System for Customized Electronic Identification of Desirable Objects". A few, however, are additionally herein mentioned:

Dating services (and social introductions)

Automatic creation of virtual work groups the users for which match qualification criteria for a specified task or project (e.g. across the Internet or an extranet).

Professional Introductions, Meetings and Conventions—User profiles are specified by the requestor as qualifying criteria which are desirable for purposes of introduction. All willing participants' professional profiles are submitted to the service.

Matching users according to spoken real-time conversations—Deploying the use of voice recognition and text analysis algorithms as is described in the above patent, e.g. in conjunction with the use of cellular telephony or external acoustic sensors).

Virtual tags and out-bound messages—The following extends the use of user privacy policies regarding third party reachability and access to users and user specific information through use of the proxy server within the context of LEIA as described in issued patent "Pseudonymous server for System for Customized Electronic Identification of Desirable Objects". In this application, spoken, written, graphical or profile information associated with a user may be disclosed to other users within local proximity of the user. Specifically, a "virtual tag" could be viewed as a static message which is persistent and untamperable information (typically this information consists of meta-data) which is associated with that particular user. In one application it may be used within the user's visible proximity to identify them in conjunction with certain user profile information or user credentials (or any other type of message) which is desirable for the user to release to a third party, whereby access privileges by that third party to all or a portion of the profile are typically conditional upon the recipient's user profile (to the extent it is disclosed to the sender) as may be the nature/selection of any disclosed message as presented to that particular third party within the virtual. Conversely, the recipient's filtering rules may be used to permit delivery of or filtering of certain portions (or all) information in the virtual tags as well as outbound messages generated dynamically by the sender.

The primary criteria for matching users may include similar user profiles reflecting common interest venues to that of the user or (alternatively) complimentary attributes within the user profiles in which there is complementarity in knowledge or skill sets by which tasks and/or knowledge sharing is the primary objective (where the desired attributes are typically identified by a requestor). LEIA can thus notify target users within physical proximity to one another which match the criteria for introduction. Queries or task requirements in the form of requests may also be submitted in addition to (or in place of) the requestor's user profile. The present matching process identifying appropriate target users may of course be performed on a dynamic real-time basis (in accordance with submission of specific requests or queries) within the context of the present dynamic location enhanced matching scheme. As above suggested, access control criteria dictating profile access and reachability of the user (via physical or virtual introduction or receipt of a message) may be controlled accordingly based upon the profile of the requestor (as is disclosed) and/or the nature of his/her request (or other message). Similarly, such access controls may be used to enable (or restrict) the ability of an explicitly identified user (UID) to be automatically identified upon his/her entering the same physical proximity of the requestor. As is suggested in the above referenced patent, a further means by which users may access user profiles includes (subject to accessee approval), assigning of user profiles (which are typically pseudonymized) according to appropriate cluster (or attribute) criteria (including location criteria) and the construction of conveniently navigable hierarchical menus. Virtual tags may also be ascribed by users to physical objects (or potentially even other users) where an XML representation is constructed with a (future) location tag which can be automatically indexed by future users at that location. Such information could relate to a variety of rating criteria (which could be averaged across users) and/or annotations (potentially even hazards). It may be associated with rules dictating the user's disclosure policy with respect to which user(s) or user type may gain access to which information (e.g. who can access the identity or profile information associated with the tag). It could even be allocated to only the same user (e.g. as reminders, notes or certified documentation). H. Web Interface to User Location and Profiling Data for Advertising purposes—In co-pending patent application entitled "Secure Data Interchange" (SDI), a web interface is provided for advertisers to search a widely distributed data base of user profiles, according to specified usage and privacy constraints. The search can be performed on any number of attributes, for example sites visited, categories or topics of sites visited, banner advertisement clickthroughs, purchase inquiries and purchases, demographics, etc. Secure Data Interchange is designed to allow the integration of information about users across different vendors, but only to the extent permitted by a user. Data mining techniques and human data analysts can then be used to identify appropriate cross-vendor, cross-advertiser and cross-product synergies, with the goal of enriching the data models and personalization power of individual vendors and advertisers.

One key application of Secure Data Interchange is in targeting advertising to an appropriate audience. The location enhanced information delivery system 100 augments the data that is available to an advertiser with location information and allows location specific advertisements. For example, local advertisers may desire targeting of users with relevant profiles that are also located in close proximity to the location of the service, for example while users travel with portable user terminal devices or pass a local electronic display, as well as identify users whose devices are connected to a land network. The above mentioned patent teaches a method in which advertisers can query a database of profile information for certain desired user attributes. If a vendor meets certain user pre-defined access criteria via features and credentials, user profile data may be accessed in accordance with the user's privacy policy. Data mining tools can be used to enable advertisers to identify relevant features. Advertisers may enter rules that specify how users are to be targeted, based on desired criteria such as those pseudonyms that possess certain attributes.

In the present environment of LEIA, vendors and advertisers are likely to request: (1) access to certain user profile data relating to user location information (in addition to other profile information); (2) If such access is granted, the right to target the user with information, such as advertisements. Additionally, information about the vendor OR his/her products or services may also be relevant information to the user. The user can use this information (within SDI) to control profile access and delivery of targeted advertising (or other information). For example, the advertiser may be willing to provide products or services of a particular type, quality and price if the user is willing to reveal (or prove) certain specified attributes. Subject to the user's privacy policy, vendors may be notified when a user requests information about a vendor, and initiate negotiation.

Once targeted advertising is delivered to the appropriate users aggregate statistics regarding the user's behavior and responses are collected and delivered back to the advertiser via a central SDI database. Secure Data Interchange also allows an advertiser to receive information on the specific behavior associated with the delivery of an ad to an anonymous or pseudonymous user. This data can include the click stream relating to the ad, the actual similarity of the pseudonym's profile to the ad profile, or more extensive data for example that pertaining to the clickstream patterns on the vendor's site, or across other sites as correlated according to the particular types of attributes of the sites, or user attributes.

The addition of location information to a system of Secure Data Interchange introduces new opportunities. In particular, the location enhanced information delivery system 100 allows information to be pushed to users as they move around in an environment, even when users are not connected to the Internet through a dedicated client. The location enhanced information delivery system 100 allows a stationary electronic display device located in the environment to be activated according to profile information that is associated with the pseudonym that is revealed by the location identifier of a user. In this way the location enhanced information delivery system 100 significantly expands the reach of the advertising and information filtering/presentation applications of the Secure Data Interchange.

Location information also introduces new concerns about the privacy of individuals. One way in which Secure Data Interchange protects the privacy of users is through the randomization and subsequent aggregation of profile information. Even though a pseudonym is not explicitly identified with a user it is possible that a user can be associated through revelation of other identifying information, such as specific transaction information (e.g. credit card). Secure Data Interchange randomizes scalar information through the addition of additive noise, and labels through substitution from an approximate equivalence class (or cluster). An advertiser can still make use of randomized profile information in the aggregate, and Secure Data Interchange aggregates data that is then disclosed to vendors. This technique of randomization can be usefully extended to location information. It is necessary to ensure that the continuity of location information cannot be used to compromise the privacy guarantees that are provided by Secure Data Interchange.

For example, if it is observed that pseudonym P1 disappears from location X, as another pseudonym P2 appears in a location very close to X, then it is possible to reason about the likelihood that pseudonym P1 and P2 are pseudonyms for the same user. The accuracy of such an inference depends on a number of factors, that include: (1) the number of pseudonyms that are disappearing and appearing in the vicinity of X; and (2) the accuracy with which location can be identified; (3) the spatial density of pseudonyms. The location enhanced information delivery system 100 modifies the information that is augmented to pseudonyms to prevent such attacks. Solution techniques include, but are not limited to, (1) randomizing the location information to a degree that is sufficient to prevent this type of user tracking, while still allowing accurate location-based information delivery; and (2) randomizing the temporal information about when pseudonyms appear and disappear—for example allowing "ghost" pseudonyms to continue for random intervals, and delaying the appearance of identifiers for new pseudonyms. A location enhanced information delivery system 100-enhanced Secure Data Interchange system can also allow a user to block the revelation of location information for any pseudonyms, as part of the privacy and pseudonym-management policies.

In another variation, user location data is known but the time attribute is randomized concealing the user's whereabouts at any given time. In this variation the user can also limit revelation of their user profile information to whether or not the ad is "similar" to the user profile, so that advertisers can only determine the number of location identified pseudonyms within a given threshold distance of metric similarity of the advertiser's ad, without receiving any specific information about a user.

Given that these protections are in place, an example request by an advertiser (or other information provider) in the context of the location enhanced information delivery system 100 could be, display (either to personal user terminal devices or stationary electronic display devices) an advertisement (or other type of information message X) to the 100 users that are most likely to be interested in advertisement X (e.g. through profile analysis). For example, a sports supplier can request a targeted advertisement for tennis shoes, to users with pseudonym profiles that suggest an interest in sports and in particular the genre of racket sports, are under the age of 40, and within 10 miles of the vendor's physical location. The location-enhanced information delivery system 100 and Secure Data Interchange will present the advert to suitable prospects that choose to reveal location information, and are in a close proximity to the vendor. Secure Data Interchange can provide optional aggregate statistics about the number of users that match the criteria, and the quality of match—without revealing any information about the individual users that are targeted.

Thus, within the framework of the above example, the proxy server may activate a rule which is requested on behalf of the vendor to target the users within a 10 mile radius which most closely match the interest criteria for: tennis shoes as stated without actually revealing any associated location information to the vendor (even in aggregate form). In this variation, it should be noted that the vendor does not necessarily have to know the number of users which match his/her target advertising criteria. Even if purchases are being made, location data can be withheld entirely from the vendor.

There are other variations of user location data release that do not present much of a threat to user privacy. For example, the vendor may be advised of certain data about the responses of users to the advertising, such as the number of users which clicked through the ad, purchased the tennis shoes and perhaps some ratio of the above compared to the number of users which match the particular targeting criteria by location.

Another technique for protecting user-privacy allows an advertiser (or vendor) to submit rules for targeting certain users with certain ads on the basis of user profile attributes (including click stream patterns) to a network-vendor level Secure Data Interchange proxy server or client-level Secure Data Interchange proxy. The Secure Data Interchange proxy can autonomously activate personalization rules for a vendor, given pseudonym profiles, while: (a) enforcing a user's privacy and information-release policies; (b) preventing the release of profile information to vendors. The vendor may receive indirect information about the profiles of users through randomized aggregate statistics. Within the framework of the location enhanced information delivery system 100, the preferred implementation of this technique maintains the location information of a pseudonym as close to the user device terminal as possible, either on the client itself or at the proxy server.

The location enhanced information delivery system 100 also provides additional feedback to improve the model's overall performance by taking into consideration time, location, as well as the metrics relating to general user interests and preferences. A human analyst might also perform further analysis, for example combining the user's profile and the target object of an item browsed or purchased and/or physically visited, in light of location- time patterns. These inferences may provide further contextual information about a target object profile, user profile, or the nature of the present activities of the user in a temporal context.

According to the issued divisional applications of patent application "System for Customized Electronic Identification of Desirable Objects", user profiles may be in part generated/updated in accordance with the target object profiles the users visit (which may include features of other user profiles because they are transcribed to the target object profile of the target object as a result of the other user interacting with that target object and target object profiles may be generated/updated in accordance with the user which may contain attributes of other target objects using the same rationale. In this way The Location Enhanced Information Architecture 100 may accordingly extend the context in which a user is known to interact with a target object in that physical target object which the user visits or observes (e.g. is possibly observed via LEIA to stop, approach or spend time reading) may contain (or assume) profile information in accordance with the physical interaction engaged by the user (e.g., some attributes may include the name of a target object, its category, textual information which is associated with it in a physical context, e.g. from HTML pages associated with it or other text as is known to be displayed on an advertising message board (or other informational display).

To ensure the utmost security of the user profile data, the Secure Data Interchange specification additionally suggests utilizing and deploying the operation of the pseudonym proxy server at the client level which, in addition to anonymizing or pseudonymizing the user's profile, prevents a third party proxy server operator from operating or potentially gaining any access to such sensitive data as name, profile and/or location correlations. Thus, this privacy enhancement may, for certain implementations of the location enhanced information delivery system 100 where such client-level proxy is feasible, add enhanced security to the user's personal data.

H. Use of Metatags to Maintain and Update Target Object Profiles in a LEIA-enhanced System In co-pending patent application titled "Secure Data Interchange" we describe a system for the automatic profiling of the web pages of on-line vendors, and of users that participate in transactions on-line, and browse the Internet. The profiling is performed within a secure and privacy-protected framework. The system of Secure Data Interchange collects and distributes information consistent with user- and vendor-defined policies. Information can be explicit data, including transactional information that is collected by parties that are involved in a transaction—such as the product purchased, and demographic information (e.g. gender, zip code, occupation). Information can also be implicit data, that includes click stream data that logs the information that a user requests and views, and the time-sequence of hyperlinks that a user follows as he/she browses across multiple web sites.

The LEIA system extends the type of profiling information available within the Secure Data Interchange, allowing new data about the physical location of users and the physical location of vendors that are associated with web sites to be associated with the other types of profiling information. This information is useful when the product or service that is offered by a vendor is location-dependent, for example to a vendor with a web server that provides topical information on restaurants and hotels in the proximity of a user that is browsing from his car. A vendor or user can provide location information explicitly, and in addition the physical location of on-line vendors can be inferred from server IP addresses and the location statistics of users that access the vendor's site. The methods disclosed in the current patent provide information on the physical location of users.

In our preferred architecture the profiles that are generated for the target objects on a web page are embedded directly within the web page, and stored at source on a vendor's origin server. A vendo r can provide detailed information about its physical location, that LEIA can use to identify and inform relevant users. Alternatively pages can be automatically tagged with predicted location information as provided by LEIA, using the tag-update functionality of SDI (described below).

The profile and location information is embedded within a web page as metadata, that is data about data—machine readable information that informs an intelligent agent (such as an SDI-enabled browser) about the data that is included in a web document. The eXtensible Markup Language (XML) proposal of the Worldwide Web Consortium working group on SGML provides an ideal standard for representing such information. XML allows meta-content to be included with documents, machine-readable information that enables documents to be processed by client software. Augmenting web documents with structured information in SDI enables clients to perform user personalization—pushing computation to clients, and allowing greater control over user-profiles because profiles do not need to be released from clients.

XML provides the ability to embed data within web pages, that in turn allows client-side processing of information. By embedding profile and location information directly within a web document we can alleviate the bandwidth and computational bottlenecks that can occur at a centralized profile server if profiles are fetched on-the-fly when web pages are downloaded by clients. The origin server (supported by the vendor) requests periodic profile updates from the central SDI server. This duplication of information enables the profile and the page contents to be provided directly from a vendor's server.

There are some potential drawbacks of this approach: (1) the profile information associated with a web page and target objects can be out-of-date; (2) the profile information is available to all clients and proxy servers, not just those that are SDI-enabled; (3) the profile information can be altered. We suggest technical solutions to each of these problems in the co-pending patent application, Secure Data Interchange. We limit the performance degradation caused by out-of-date profile information that is stored within web pages of on-line vendors by associating "out-of-date" time stamps with the profiles that are provided by the central SDI server. Vendors request new profile updates when the current profile information is out-of-date, and more frequently if required (although we allow for a per-update charge).

The privacy of information in transit between servers and clients can be assured through standard end-to-end cryptographic solutions that establish a secure session prior to any data exchange, such as Secure Sockets Layer (SSL) that uses X.509 certificates and is supported by current browser technology. In addition, we prevent unauthorized access of embedded profile information through the encryption of the metadata that is represented within the XML structure of a web page. Profile information can be encrypted using a hierarchy of keys, so that different levels of access to the information may be provided according to the access levels of users and vendors. All users that request web pages from SDI-enabled vendors, whether or not the user is a member of SDI receive the same profile information. We provide encrypted profiles to vendors in the 'Profile Update' messages from SDI to vendor servers, so that: (a) unauthorized agents cannot tamper with the profiles; (b) the profiles cannot be read by unauthorized agents.

SDI supplies a private key to trusted SDI client software, that enables only SDI-enabled clients to access profile information, and only access that information to the extent permitted by privacy policies of users and vendors. Different levels of encryption enforce multiple levels of access. Periodically the key pairs are changed to prevent extended attempts at cryptographic attacks. SDI uploads the key that provides the correct level of access for a user to a user's client, once terms of access and profile management have been agreed. A client can only access embedded information once enabled with a relevant key. Finally, profile information is signed with a digital certificate, to prevent third parties from tampering with profiles for commercial gain.

In one variation of SDI the profile of a user is maintained on the user's client, and partitioned into separate profiles for each pseudonym that a user chooses to maintain. Personalization of products and services (product types, prices, etc.) is performed at the client, through the execution of trusted code that is embedded as a Java applet or as JavaScript within the web document of a vendor. In this way a vendor never receives access to the profile of a user, but is nevertheless able to personalize its response to users, even when a user first visits a site (on the basis of the profile for a user from his/her previous online transactions). Profiles for the target objects of a vendor that enable appropriate objects (representing particular products, or news stories for example) to be presented to a user are embedded as XML data within the vendor's web document. The profile information in LEIA-enhanced SDI can include location information about products and services that are provided by a vendor.

The location information about a user, as generated through LEIA, is maintained at the client machine of the user, and compared to location data that is embedded as metadata within a vendor's web document. Location based matching can be performed at the client, for example looking for matches between users that have similar characteristics and physical location, or users that match the profile of a web site and are in close physical proximity to the service provided.

An XML document has an associated schema definition to enable an XML-enabled browser to validate the structure of XML data automatically. A Schema in XML is called a Document Type Definition (DTD), and defines the names of tags, their structure, and their content model. XML allows the DTD for an XML file to be identified through a Universal Resource Indicator [URI] in the header of the file (see below). XML also allows URIs for mobile code resources to be referenced, in order to enable a client to process embedded XML data. An XML document must be well formed, and in order to be well formed the tags must form a tree structure. In addition, the DTD allows the structure of an XML document (an instance) to be validated against a particular schema. Senders and receivers must only send valid SDI files. Each SDI message is a valid XML document.

We provide an example XML instance and part of a Document Type Definition for use within the systems of LEIA and SDI. Profile information, as generated automatically through collaborative filtering techniques (for example, see issued U.S. Pat. No. 5,754,939) can be represented as a list of attribute-value pairs within an XML document. An attribute is defined by a numeric code, and the value defines the weight of the attribute. Location information can be explicitly represented, in addition to demographic information about a user. For example:

```
<?XML version = "1.0"?>
<?xml:namespace ns = "http://www.w3.org/OPS/OPS" prefix = "OPS" ?>
<?xml:namespace ns = "http://www.sdi.com" prefix = "SDI" ?>
<!doc>
<SDI:ProfileData>
    <SDI:Location>
        <SDI:Geocode> 12321561 </SDI:Geocode>
        <SDI:DigiMap> http://www.digimap/?12321561 </SDI :DigiMap>
        <OPS:Zip> 19103 <SDI:/Zip>
    <SDI:/Location>
    <OPS:Demographic>
        <OPS:Gender> F.</OPS:Gender>
        <OPS:Age> 26 </OPS:Age>
        <OPS:Income> 50000–75000 </OPS:Income>
    </OPS:Demographic>
    <SDI:ID>
        <SDI:Pseudonym> P12543 </SDI:Pseudonym>
        <SDI:PublicKey> 12453246129421 </SDI:PublicKey>
    </SDI:ID>
    <SDI:Profile>
        <SDI:Profile-item> (1242, 0.546) </SDI:Profile-item>
        <SDI:Profile-item> (56, 0.045) </SDI:Profile-item>
    </SDI:Profile>
</SDI:ProfileData>
```

The Document Type Definitions for this document are specified in the header, and include URIs to a DTD of the Open Profiling Proposal of the W3C, and also a DTD of the Secure Data Interchange. The OPS DTD is used to bootstrap the SDI DTD, providing tags for common profile information, such as 'Gender', 'Age', 'Income', etc. The section of the SDI Document Type Definition that is used in the above XML fragment is presented below. It makes reference to tags defined in the OPS DTD, and the RDF (Resource Description Framework), a W3C proposal to standardize the structure of DTDs for XML documents.

XML Name spaces [NS] provide a method for unambiguously identifying the semantics and conventions governing the particular use of property-types by uniquely identifying the governing authority of the vocabulary, for example OPS and SDI in the example above. The URI for a schema can contain a human and machine-readable description of an XML schema.

```
<!ELEMENT SDI:ProfileData (SDI:Location?, OPS:Demographic?,
SDI:ID?, SDI:Profile?) >
<!ELEMENT SDI:Location (SDI:Geocode?, SDI:DigiMap, OPS:Zip?,
OPS:Address?) >
<!ELEMENT SDI:ID (OPS:Name?, SDI:PublicKey?, SDI:Pseudonym?) >
<!ELEMENT Profile RDF:list<SDI:Profile-item> >
<!ELEMENT SDI:Geocode #PCDATA >
<!ELEMENT SDI:Digimap #URI >
<!ELEMENT SDI:PubicKey #PCDATA >
<!ELEMENT SDI:Pseudonym #PCDATA >
<!ELEMENT SDI:Profile-item (SDI:Attribute-ID, SDI:Attribute-value) >
<!ELEMENT SDI:Attribute-ID #PCDATA >
<!ELEMENT SDI:Attribte-value #PCDATA >
```

The tag '#PCDATA' is used here to represent numeric or textual information, '#URI' declares that an instance of element 'SDI:Digimap' must be a valid URI pointer.

Device Description

An in-store version of the location enhanced information delivery system 100 takes advantage of the fact that retailers are already amassing data through "shopper loyalty" cards. In this variation targeted ads consist of primarily product solicitations with associated prices and promotions, the preferred user profile processing algorithm is a particular version of a collaborative filter, as taught in co-pending patent application entitled, "System for Customized Prices and Promotions". The methods suggested by the use of a "collaborative filter" elsewhere in the current specification are more typically used to target non-offers, i.e. for "general purpose" recommendations for advertising. As such, applying the methods taught in its parent case, "System for Customized Electronic Identification of Desirable Objects" would accordingly be appropriate in most other applications of LEIA.

The shopper loyalty system resides in a central computer and is linked electronically to check-out counters and shopper-accessible kiosks. The shopper loyalty system is used by retailers to extract and model patterns of customer behavior, allowing for the design of optimal sales promotions. When a shopper returns to one of the linked stores and passes the customer loyalty card through a kiosk's reader, coupons and promotions tailored to the shopper's personal preferences and to the vendor's overall marketing strategy are printed for use in that day's shopping trip. In reality, the database that forms the foundation for such a shopper loyalty system derives its input from many different sources. As previously mentioned, there is a wealth of information to be derived from on-line retailing; since the interaction is purely electronic, it is a trivial matter to record each customer's on-line purchase individually. Magnetic "shopper loyalty" cards extend this highly-detailed data acquisition capability to more traditional point-of-purchase venues. Simply stated, a customer's shopper loyalty card is swiped at the same time as a set of purchases are being made. This information is transmitted to the store's central database, which records the shopper's identity, the date, the time, and the items purchased. Over the course of several visits, a very detailed shopper profile is constructed. In addition to storing information about the number and types of items purchased at different dates and times, the database notes the customer's price sensitivities and coupon usage. Extremely detailed information about the purchase items is also noted. Information about a product's color, size, shape, packaging, and advertising—anything that might impact its direct appeal to customers—is recorded. A final piece of information stored for each purchase item might be the history and relative effect of the coupons that have already been generated for it. In time, the vendor develops a highly detailed database that connects shoppers to purchase items, prices and coupons. This database is located on the same central computer as the collaborative filter, which is capable of analyzing the information and creating accurate models of customer behavior. This data analysis can take several different forms, depending on the filter chosen.

One useful type of collaborative filter for use in the location enhanced information delivery system 100 is implemented by hybrid cluster analysis. Such an approach is useful for situations in which customers' purchases fall into distinct categories, as is seen, for example, in grocery stores. Shoppers' grocery purchases usually fall into such general categories as dairy, meat, bread, snacks, and so forth. Hybrid cluster analysis would first identify such groupings, then allow for a detailed analysis of interactions within and across categories. Another important dimension of shoppers' behavior is time. Time series techniques can augment the capabilities of the collaborative filter, spotting patterns in cyclical or impulse purchases. This is accomplished by performing frequency analysis on the main categories of a shopper's purchases; more irregular temporal patterns can be picked up using standard pattern recognition techniques. Cyclical buying patterns arise, for example, in the case of customers with school-age children: they buy school supplies at the beginning of each academic year. Another example would be a pet owner who buys a case of dog food once a month. Time series analysis would detect these cyclical patterns, allowing the filter to model and anticipate such purchases. The location enhanced information delivery system 100 can also detect single purchases that are never repeated. This might reflect a customer's dissatisfaction with a certain product, or form part of a pattern of impulse buying. Finally, the date or time might correlate with a general purchase pattern. Neural networks can be trained to distinguish and characterize different types of shoppers. The neural network's architecture treats customer and purchase item identification numbers as inputs, the buying choices as outputs. A small three-neuron layer sits just above the customer identification inputs; as the neural network is trained with examples from the purchase database, the three-neuron layer succinctly represents the class of purchaser to which an individual shopper belongs. Economic techniques are folded into the collaborative filter to enable it to perform price point determination. That is, information about different sales, for different customers, at different prices, can be used to model customers' demand curves, allowing the vendor to anticipate shoppers' reactions to price changes. This aids in the design of profit-maximizing coupons, which would entice the greatest number of customers to make purchases at a minimum level of discount. The output stage of the point-of-purchase collaborative filtering system can take several different forms, although the goal of each is the same: present the shopper with coupons and promotions specifically tailored to their preferences (as indicated by their purchase histories) and which best support the vendor's marketing strategy. Two obvious ways of communicating promotions are by direct mail and through the retailer's Web site. A more interesting method is via the in-store electronic kiosk. The electronic kiosk consists of a screen, magnetic card reader, processing unit, and printer, mounted in a standalone cabinet. One or more such kiosks are present in many or all of a retailer's stores. They are linked electronically to the vendor's central database and collaborative filtering system, which need not be physically near the point-of-purchase. When a customer enters the store, they run their magnetic shopper loyalty card through the card reader mounted in the kiosk, which transmits the customer's identification code to the central computer. The central system, in turn, determines which coupons and promotions are most appropriate for that shopper, and transmits the information back to the kiosk. Finally, the kiosk prints out the coupons for the customer, who can use them for that day's shopping trip.

Strategic Uses for the System

To a large degree, the way in which. the collaborative filter supports the electronic kiosk depends on the retailer's financial goals and marketing strategies. Suppose the vendor wants to maximize the profits over a shopper's single visit—this implies the filter's purpose is primarily to recommend coupons and promotions that generate immediate results. There are several ways of doing this. Firstly, the collaborative filter could simply recommend coupons for items that the shopper has bought in the past. Cyclical purchases could also be taken into account and the system can promote specials when the beginning of the next cycle is near. Items that are strongly related to those already purchased by a customer should be of interest. If the customer shown a tendency towards premium brands in the past, when the price was right it might make sense to issue a coupon for a premium brand in a category the customer always buys. If the customer is new, rapid profiling (perhaps on demographic data) indicates what coupons should first be issued. In each case, the collaborative filter's ability to determine optimal price points ensures the coupons have the maximum desired effect.

In the longer-term, the electronic kiosk's valuable informational contributions to the shopping experience can be used as a tool to cement customer loyalty, both to specific retailers and to specific brands. Such contributions might include the printing of recipes tuned to shoppers' personal tastes along with coupons for the needed ingredients. Depending on the timing, the kiosk could automatically generate shopping lists to remind customers of cyclically-bought items due for another purchase. Such services encourage repeat visits by shoppers, which not only increase profits for the retailer, but allow it to refine its customer profiles even further. Such information allows the collaborative filter to determine the size of a household, the general healthfulness of the shopper, and preferred modes of buying (on-line versus off-line).

The point-of-purchase collaborative filtering system can also be used to automate experiments in marketing. That is, by allowing the central computer to offer different types of promotions across similar types of customers, the system can determine price-point sensitivities, loyalties to categories and brands, and reactions to different kinds of promotions. The results of such experiments would be statistically sound, if based on a large enough sample set, and could be fed immediately back into the kiosk system, so that the new information on shopper behavior could be put immediately into commercial use.

The location enhanced information delivery system 100 is of particular value in automatic experimentation in that it is often difficult, if not impossible, for a retailer to determine, of the items that tend to be bought together, or more particularly are bought by similar repeat customers to the store, which of these items actually motivates the customer to come to the store in the first place. By determining this, a retailer can better target advertisements to certain customers, optimize pricing, promotional discounts, construct joint promotions. The location enhanced information delivery system 100 can present an advertisement on an electronic highway billboard which could be used to present various high motivational product ads to determine which of them, if any, is a catalyst in effecting a buyer's decision to enter a store, become a long-term loyal customer or even facilitate a customer's change of loyalty to a different store.

It is conceivable that a user's indication of interest to an advertisement could then prompt more detailed information about the advertisement, which could be temporarily pre-fetched from the display subsystem 103 at the moment that the automobile or user passes by, or pre-fetched via a communication link over a wireless network. This information could include in addition to directories, data which could be tied into the navigational user interface of the automobile. For example, items which are also available at the store which are explicitly and/or implicitly determined to be of personal relevance such as those which match the customer's own personal electronic shopping list as well as associated digital coupons could provide the basis for automatic user notification and prefetching.

The efficiency of automatic determination of customized prices and promotions in optimizing retailer profits could conceivably be enhanced by the location enhanced information delivery system architecture by adding the additional metrics of the user's physical distance or more particularly, anticipated closest proximity to the vendor when traveling through that area. For example, the expected profit from a new customer might be maximized from an price function that offers a lower price to users that are further away from the retailer, to compensate for the additional cost of visiting the store. Accordingly, further benefits can be realized if the offer is further discounted, for example because of high quality demographics or a local zip code. Also, the vendor's pricing algorithm must allow the user to utilize a location-enhanced product finder (in originally finding the product or identifying similar products from other vendors), in addition to a "bargain-finder agent". The bargain-finder agent might be used to negotiate for the user with the vendor agent, that may request, for example from the proxy server, validation of competitive offers claimed by the user.

Proximity information, price (or value) sensitivity and/or rewards for customer loyalty i.e. identification of customers for providing appropriate privileges can also be used to enable a vendor to recognize a customer with a LEIA-enabled device, or alternatively some biometric user identifier, as s/he passes near a vendor's store. In this case a human, electronic display and/or even automatic door or door lock can identify the presence of the user, and also specific information about the user's profile (or credentials) to enable personalized treatment.

Whether items within the local vicinity of a user are determined to be relevant implicitly, or from explicit user selected criteria, it is possible that the location data of a vendor can also be automatically determined from the web site of a vendor (as a potential alternative to being ascribed by the vendor). The data can be identified and parsed using (possibly a combination of) Natural Language Processing (NLP) techniques, or rule based template techniques. This technique could allow location information to be used when a user is searching or browsing the web, in order to filter products and web pages according to the physical proximity of the user to their associated vendors. The system could also be used to identify similar items that are close to the user, where similar items are identified through profiling—using textual analysis, pattern recognition and hand-crafted rules as taught in the issued patent.

As described earlier, under 'H. Use of Metatags to Maintain and Update Target Object Profiles in a LEIA-enhanced System', in the 'Exemplary Applications' section, metadata can also be explicitly associated with the web pages of vendors to help an automatic filtering/search system such as Secure Data Interchange to identify relevant products and information. Metadata may be ascribed by vendors to their products in order to provide a more informative and robust infrastructure for content, that location enhanced information delivery system 100 can utilize to identify and inform relevant users.

One simple example demonstrates the power and range of possible applications of utilizing metadata within the present context of LEIA. A vendor could leverage location-enhanced information to include additional information about delivery policies. As purchasable items (including in this example, restaurant menus), are browsed, queried, or pushed to the user, other similar items from other vendors which are physically local to the user could be identified and presented to the user, either upon user request or automatically. Tags on the selections containing the associated vendor's delivery policy can be used to automatically determine and present the items that meet certain distance/delivery criteria.

Location-based metadata can also be used to activate rules that filter information on behalf of the user. For example, the user may be automatically notified of products (or other items of interest) which may be identified to be of personal relevance at such time that a user approaches such items geographically. Physical proximity can also be used as an additional selection criteria for personalization (as a client filter or on the vendor's server) in conjunction with other modes of personalized user access to (and pre-fetching of) information as is performed during querying (searching) or browsing modes (including personalized menu or "portal" navigation) as disclosed in detail in the issued divisional cases of patent application entitled "System for Customized Electronic Identification of Desirable Objects". In this regard, users who are en route (or may be planning a visit in the future) to a given physical location may enter that location as a selection criteria provided on the user interface and obtain the same location-enhanced access to Web information (as above suggested) as if the user were detected to be physically at that location by LEIA.

Once relevant products are identified, a user en route to a destination near a vendor's store can pre-order their groceries or other merchandise directly so that the user could simply pick up their pre-packaged grocery order at the time of arrival at the store. For example, an advertisement for a product on an electronic billboard could easily be pre-ordered from the user's automobile or device. Other variations on this architecture include users accessing an ATM, pay phone, kiosk or point of sale terminal within the same or different store that the user is presently visiting. For example, pre-order placements, from other vendor stores could be accompanied with an advertisement which is part of a cross sell.

In-Store Applications

Utilizing the location enhanced information delivery system 100, smart shopping carts equipped with bar code sensors can be used to collect data on customer purchases and present location as the customer shops. Customer detection location for such systems utilize infrared detectors mounted on the ceiling of the store which enables triangulation of the shopper's present location. Historic and real time profile updates to the UID can be used to update an electronic shopping list, for example in addition to general product location information "ideal shopping route" can be recommended from each item to the next closest one on the electronic shopping list. Another smart cart application is offering more detailed descriptive information plus contraindications and warnings to the user about each product being considered for purchase. If an electronic price tag is not available and if the smart cart is used for the purpose of self check out, customized prices and promotions of items displayed on the cart or electronic (LCD based) price tags could display customized prices via an electromagnetic field activation technology which conveys customized pricing information to the electronic price tag in real time. This technique may be further used to enable the smart cart to extract location data about the user directly from product identification data from the product's associated electronic price tag (in lieu of IR triangulation techniques of coordinates). Another useful application of this location specific data is in-store electronic displays. Even in the absence of location detectors, as products are scanned into the cart, electronic displays located throughout the store can display to the customer customized promotional messages relevant to items within the present store aisle via wireless connections between the devices through dynamically updating the user profile associated with the user identity as well as the long term purchase history. Such displays may also, or instead, utilize customer data which is read from the customer loyalty card through remote electromagnetic field activation technology. Another alternative approach to smart carts is the use of hand held PDAs. These devices can be used for each of the above applications for smart carts.

Implementation of a Client/Server Architecture

The location enhanced information delivery system 100 is comprised of clients, which are end-user terminal devices U1–U3 with extremely limited data storage capacity and servers, which contain client, product, and multimedia information for the information display device 107 and in addition descriptive information (directory information, schedules, indices) for the multimedia information. Clients are assumed to be under customer physical control and the following description is for the example where the display device 107 comprises an element within the user terminal device U1–U3. The transmission of the display information to the user terminal device represents a data communication issue relating to the limited available bandwidth. Considerable data can be stored in memory at the uplink point in the system. The idea here is that the server site contains all of the information which the small-memory user terminal devices U1–U3 might need. Without a hierarchical system architecture, the selectivity of the similarity algorithms do not offer any statistical gain. The method to attack this problem is to allocate a portion of a data communication channel to the user terminal device. This channel is used as a "memory" by the client/server algorithm. For example, a system using 1 Mbps of bandwidth can provide about 2300 cells per second. The use of the similarity algorithm selects which memory cells to send in the next time interval. If the response time must be better than 1 second, the scheduling interval can be a smaller value, such as 1/30 second. The bandwidth utilization is then scheduled based on the need for memory cells at the client.

Latency and Bandwidth Effects of Prefetching/Precaching

Figure 2:
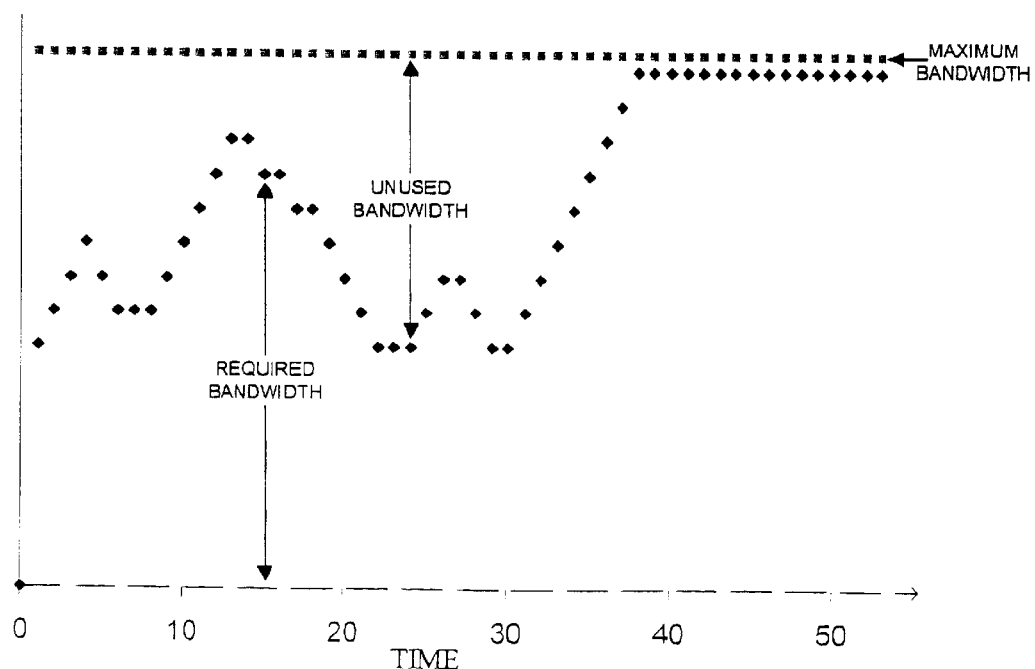
FIG. 2 illustrates the network bandwidth dynamics typical of the location enhanced information delivery system.

Even in the environmentally friendly implementation of the location enhanced information delivery system information display architecture, the use of local storage may have beneficial effects. In particular, if similarity measurement technologies are applied, the location enhanced information delivery system 100 can achieve reductions in latency, improved likelihood of effective advertising, and reduced bandwidth utilization. The location enhanced information delivery system 100 employs the idea of prefetching, which has also been referred to in the technical literature as pre-caching, cache-preloading, or anticipation. The basic idea is that if good predictions of future data requirements are available, and there is excess data-fetching capability available, the data should be fetched aggressively in anticipation of future needs. If successful, this technique has two major benefits applicable to present and future networks. First, it can reduce response-time, a major performance advantage in interactive systems. Second, it can reduce congestion and other problems associated with network overload. FIG. 2 illustrates a possible time series of bandwidths required by an application or set of applications. To understand how the responsiveness of the system is improved, it can be seen that the unused bandwidth can be used to transmit information likely to be used in the future. For example, if a list is being traversed 1,2,3,4, . . . it is likely that if object N has been requested, that object N+1 will be the next request. If N+1 is prefetched from the remote system, it is available when the request is made with additional delays. All of the "unused bandwidth" illustrated in FIG. 2 can potentially be used to pre-fetch. Congestion is due to inadequate resources. The simplest example is insufficient transmission capacity for the offered load, leading to "traffic jams." Packet-switched networks such as the Internet suffer from similar problems. In FIG. 2, it appears that capacity is being reached or exceeded near TIME=43 or so. If demands are made during this period, traffic is likely to be delayed or even lost. If we prefetch successfully during more lightly-loaded periods (such as TIME=0 . . . 42), we reduce the probability of data being requested in the future, essentially trading the guarantee of a fully loaded network today for the promise of no congestion in the future. By fetching data in anticipation of future needs, the location enhanced information delivery system 100 reduces at least probabilistically those future needs. The prefetching technology is based on unused slots being filled with pre-sent information based on the understanding of user interest using the similarity measures and used for prioritization.

The location enhanced information delivery system 100 may be usefully applied within the context of user terminal devices such as personal digital assistants, as a method of reducing response time as observed by users. The location enhanced information delivery system 100 provides a technological means by which the prefetched data can be intermixed with on-demand data to provide overall improvements in response time to a large population users, with reduced memory requirements. Second, the location enhanced information delivery system 100, which views the downlink as a fixed capacity resource, provides a general scheduling method embodying techniques such as user preferences to prefetch when slots or bandwidth are underutilized, to preemptively reduce future demand for bandwidth.

Summary

The present location enhanced information delivery system presents the information most suited to the real audience, as measured by location information systems, rather than to a static predicted audience. The invention can be effectively coupled with previous inventions in distributed data storage to prefetch required data, based both on stored customer characteristics and dynamic characteristics such as (i) presence at a particular location; (ii) motion in a particular direction; (iii) rate of motion in a particular direction and (iv) characteristics of an information display, such as its location and directionality. The invention can use an auction-like bidding algorithm to select data for display, providing maximum revenue opportunity for the display owner, and an ecologically-attractive display shutdown for electronic displays when no acceptable bid is available. While the preferred embodiment discloses a beaconing-style wireless technology, the system concept is easily extensible both to other location-information systems, such as license-plate scanning with cameras, and to utilizing the location-information for private displays of information in addition to public displays of information.

What is claimed is:

1. A system for customizing the delivery of information by an information server to a plurality of information recipients, wherein said information server transmits said information to information recipients who are located within a predetermined vicinity of said information server, comprising:

(a) means for automatically determining a user profile for each of a plurality of potential information recipients;

(b) means for determining a presence of said potential information recipients of said information in said vicinity of said information server;

(c) means for determining an identity of said potential information recipients of said information; and (d) means for modifying said information as a function of said determined identity and associated user profiles of said potential information recipients.

2. The system for customizing the delivery of information of claim 1 wherein said means for determining a presence comprises:

means for establishing a wireless communication connection to a user terminal device in the possession of said potential information recipients of said information in said vicinity of said information server.

3. The system for customizing the delivery of information of claim 2 wherein said means for determining a presence further comprises:

means for retrieving a location identifier from said user terminal device in the possession of said potential information recipients of said information in said vicinity of said information server, wherein said location identifier is unique to said user terminal devices.

4. The system for customizing the delivery of information of claim 3 wherein said means for determining an identity comprises:

means, responsive to said location identifier, for associating said location identifier with a user identifier that uniquely identifies said user.

5. The system for customizing the delivery of information of claim 4 wherein said means for determining an identity further comprises:

means, responsive to said use identifier, for associating said user identifier with a user profile that identifies predetermined characteristics of said user.

6. The system for customizing the delivery of information of claim 5 wherein said means for modifying said information comprises:

means, responsive to said user profiles of said information recipients who are located within a predetermined vicinity of said information server, for identifying an appropriate set of information to be displayed to said information recipients who are located within a predetermined vicinity of said information server.

7. The system for customizing the delivery of information of claim 6 wherein said means for modifying said information further comprises:

means for transmitting said identified appropriate set of information to said information recipients who are located within a predetermined vicinity of said information server.

8. The system for customizing the delivery of information of claim 1 wherein said means for determining an identity comprises:

means, responsive to determining a presence of a potential information recipient of said information in said information in said vicinity of said information server, for generating a user identifier that uniquely identifies said potential information recipient.

9. The system for customizing the delivery of information of claim 8 wherein said means for determining an identity further comprises:

means, responsive to said user identifier, for associating said user identifier with a user profile that identifies predetermined characteristics of said potential information recipient.

10. The system for customizing the delivery of information of claim 1 wherein said means for modifying said information comprises:

means, responsive to said determined identity of said potential information recipients, for identifying an appropriate set of information to be displayed to said potential information recipients.

11. The system for customizing the delivery of information of claim 10 wherein said means for modifying said information further comprises:

means for transmitting said identified appropriate set of information to said potential information recipients who are located within a predetermined vicinity of said information server.

12. The system for customizing the delivery of information of claim 2 wherein said means for modifying said information further comprises:

means for prefetching said information to said information server from at least one data source where said information is stored.

13. The system for customizing the delivery of information of claim 12 wherein said means for prefetching comprises:

means for producing a prioritized plurality of information segments from each of a plurality of data items which are available from said at least one data source; and means for providing data to said user terminal device, identifying a selected data item by a first of said prioritizing information segments of said selected data item.

14. A method for customizing the delivery of information by an information server to a plurality of information recipients, wherein said information server transmits said information to information recipients who are located within a predetermined vicinity of said information server, comprising the steps of:

(a) automatically determining a user profile for each of a plurality of potential information recipients;

(b) determining a presence of said potential information recipients of said information in said vicinity of said information server;

(c) determining an identity of said potential information recipients of said information; and (d) modifying said information as a function of said determined identity and associated user profiles of said potential information recipients.

15. The method for customizing the delivery of information of claim 14 wherein said step of determining a presence comprises:

establishing a wireless communication connection to a user terminal device in the possession of said potential information recipients of said information in said vicinity of said information server.

16. The method for customizing the delivery of information of claim 15 wherein said step of determining a presence further comprises:

retrieving a location identifier from said user terminal devices in the possession of said potential information recipients of said information in said vicinity of said information server, wherein said location identifier is unique to said user terminal device.

17. The method for customizing the delivery of information of claim 16 wherein said step of determining an identity comprises:

associating, in response to said location identifier, said location identifier with a user identifier that uniquely identifies said user.

18. The method for customizing the delivery of information of claim 17 wherein said step of determining an identity further comprises:

associating, in response to said user identifier with a user profile that identifies predetermined characteristics of said user.

19. The method for customizing the delivery of information of claim 18 wherein said step of modifying said information comprises:

identifying, in response to said user profile of said information recipients who are located within a predetermined vicinity of said information server, an appropriate set of information to be displayed to said information recipients who are located within a predetermined vicinity of said information server.

20. The method for customizing the delivery of information of claim 19 wherein said step of modifying said information further comprises:

transmitting said identified appropriate set of information to said information recipients who are located within a predetermined vicinity of said information server.

21. The method for customizing the delivery of information of claim 14 wherein said step of determining an identity comprises:

generating, in response to determining a presence of a potential information recipient of said information in said vicinity of said information server, a user identifier that uniquely identifies said potential information recipient.

22. The method of customizing the delivery of information of claim 21 wherein said step of determining an identity further comprises:

associating, in response to said user identifier, said user identifier with a user profile that identifies predetermined characteristic of said potential information recipient.

23. The method for customizing the delivery of information of claim 14 wherein said step of modifying said information comprises:

identifying, in response to said determined identity of said potential information recipients, an appropriate set of information to be displayed to said potential information recipients.

24. The method of customizing the delivery of information of claim 23 wherein said step of modifying said information further comprises:

transmitting said identified appropriate set of information to said potential information recipients who are located within a predetermined vicinity of said information server.

25. The method for customizing the delivery of information of claim 15 wherein said step of modifying said information further comprises:

prefetching said information to said information server from at least one data source where said information is stored.

26. The method for customizing the delivery of information of claim 25 wherein said step of prefetching comprises:

producing a prioritized plurality of information segments from each of a plurality of data items which are available from said at least one data source; and providing data to said user terminal device, identifying a selected data item by a first of said prioritized information segments of said selected data item.

27. A system for customizing the delivery of information by an information server to a plurality of information recipients, wherein said information server transmits said information to information recipients who are located within a predetermined vicinity of said information server, comprising:

(a) means for automatically determining a user profile for each of plurality of potential information recipients;

(b) means for determining a population of said information recipients in said vicinity of said information server;

(c) means for determining an identity of each of said information recipients;

(d) means for determining a composite user profile for said population of information recipients utilizing said user profiles; and (e) means for delivering information that is a function of said composite user profile.

28. The system for customizing the delivery of information of claim 27 wherein said means for delivering information includes:

means for pricing delivery of said information based on bids received from information purveyors.

29. The system for customizing the delivery of information of claim 28 wherein said means for delivering information further includes:

means for providing said composite user profile to said information purveyors.

30. A method of customizing the delivery of information by an information server to a plurality of information recipients, wherein said information server transmits said information to information recipients who are located within a predetermined vicinity of said information server, comprising the steps of:

(a) automatically determining a user profile for each of said plurality of potential information recipients;

(b) determining a population of said information recipients in said vicinity of said information server;

(c) determining an identity of each of said information;

(d) determining a composite user profile for said population of information recipients; and (e) delivering information that is a function of said composite user profile.

31. The method for customizing the delivery of information of claim 30 wherein said step of delivering information includes:

pricing delivery of said information based on bids received from information purveyors.

32. The method for customizing the delivery of information of claim 31 wherein said step of delivering information further includes:

providing said composite user profile to said information purveyors.

33. A system for customizing the delivery of information by an information server to a plurality of information recipients, wherein said information server transmits said information to information recipients who are located within a predetermined vicinity of said information server, comprising:

(a) means for profiling each of a plurality of potential information recipients;

(b) means for determining a presence of said potential information recipients of said information in said vicinity of said information server;

(c) means for determining an identity of said potential information recipients of said information and retrieving associated profiles; and (d) means for modifying said information as a function of a plurality of profiles of said potential information recipients.

34. The system for customizing the delivery of information of claim 33 wherein said means for determining a presence comprises:

means for establishing a wireless communication connection to a user terminal device in the possession of said potential information recipients of said information in said vicinity of said information server.

35. The system for customizing the delivery of information of claim 34 wherein said means for determining a presence further comprises:

means for retrieving a location identifier from said user terminal device in the possession of said potential information recipients of said information in said vicinity of said information server, wherein said location identifier is unique to said user terminal devices.

36. The system for customizing the delivery of information of claim 35 wherein said means for determining an identity comprises:

means, responsive to said location identifier, for associating said location identifier with a user identifier that uniquely identifies said user.

37. The system for customizing the delivery of information of claim 36 wherein said means for determining an identity further comprises:

means, responsive to said use identifier, for associating said user identifier with a user profile that identifies predetermined characteristics of said user.

38. The system for customizing the delivery of information of claim 37 wherein said means for modifying said information comprises:

means, responsive to said user profiles of said information recipients who are located within a predetermined vicinity of said information server, for identifying an appropriate set of information to be displayed to said information recipients who are located within a predetermined vicinity of said information server.

39. The system for customizing the delivery of information of claim 38 wherein said means for modifying said information further comprises:

means for transmitting said identified appropriate set of information to said information recipients who are located within a predetermined vicinity of said information server.

40. The system for customizing the delivery of information of claim 33 wherein said means for determining an identity comprises:

means, responsive to determining a presence of a potential information recipient of said information in said information in said vicinity of said information server, for generating a user identifier that uniquely identifies said potential information recipient.

41. The system for customizing the delivery of information of claim 40 wherein said means for determining an identity further comprises:

means, responsive to said user identifier, for associating said user identifier with a user profile that identifies predetermined characteristics of said potential information recipient.

42. The system for customizing the delivery of information of claim 33 wherein said means for modifying said information comprises:

means, responsive to said determined identity of said potential information recipients, for identifying an appropriate set of information to be displayed to said potential information recipients.

43. The system for customizing the delivery of information of claim 42 wherein said means for modifying said information further comprises:

means for transmitting said identified appropriate set of information to said potential information recipients who are located within a predetermined vicinity of said information server.

44. The system for customizing the delivery of information of claim 34 wherein said means for modifying said information further comprises:

means for prefetching said information to said information server from at least one data source where said information is stored.

45. The system for customizing the delivery of information of claim 44 wherein said means for prefetching comprises:

means for producing a prioritized plurality of information segments from each of a plurality of data items which are available from said at least one data source; and means for providing data to said user terminal device, identifying a selected data item by a first of said prioritizing information segments of said selected data item.

46. A method for customizing the delivery of information by an information server to a plurality of information recipients, wherein said information server transmits said information to information recipients who are located within a predetermined vicinity of said information server, comprising the steps of:

(a) profiling each of a plurality of potential information recipients;

(b) determining a presence of a plurality of said potential information recipients of said information in said vicinity of said information server;

(c) determining an identity of said potential information recipients of said information and retrieving associated profiles; and (d) modifying said information as a function of a plurality of profiles of said potential information recipients.

47. The method for customizing the delivery of information of claim 46 wherein said step of determining a presence comprises:

establishing a wireless communication connection to a user terminal device in the possession of said potential information recipients of said information in said vicinity of said information server.

48. The method for customizing the delivery of information of claim 47 wherein said step of determining a presence further comprises:

retrieving a location identifier from said user terminal devices in the possession of said potential information recipients of said information in said vicinity of said information server, wherein said location identifier is unique to said user terminal device.

49. The method for customizing the delivery of information of claim 48 wherein said step of determining an identity comprises:

associating, in response to said location identifier, said location identifier with a user identifier that uniquely identifies said user.

50. The method for customizing the delivery of information of claim 49 wherein said step of determining an identity further comprises:

associating, in response to said user identifier with a user profile that identifies predetermined characteristics of said user.

51. The method for customizing the delivery of information of claim 50 wherein said step of modifying said information comprises:

identifying, in response to said user profile of said information recipients who are located within a predetermined vicinity of said information server, an appropriate set of information to be displayed to said information recipients who are located within a predetermined vicinity of said information server.

52. The method for customizing the delivery of information of claim 51 wherein said step of modifying said information further comprises:

transmitting said identified appropriate set of information to said information recipients who are located within a predetermined vicinity of said information server.

53. The method for customizing the delivery of information of claim 46 wherein said step of determining an identity comprises:

generating, in response to determining a presence of a potential information recipient of said information in said vicinity of said information server, a user identifier that uniquely identifies said potential information recipient.

54. The method of customizing the delivery of information of claim 53 wherein said step of determining an identity further comprises:

associating, in response to said user identifier, said user identifier with a user profile that identifies predetermined characteristic of said potential information recipient.

55. The method for customizing the delivery of information of claim 46 wherein said step of modifying said information comprises:

identifying, in response to said determined identity of said potential information recipients, an appropriate set of information to be displayed to said potential information recipients.

56. The method of customizing the delivery of information of claim 55 wherein said step of modifying said information further comprises:

transmitting said identified appropriate set of information to said potential information recipients who are located within a predetermined vicinity of said information server.

57. The method for customizing the delivery of information of claim 47 wherein said step of modifying said information further comprises:

prefetching said information to said information server from at least one data source where said information is stored.

58. The method for customizing the delivery of information of claim 57 wherein said step of prefetching comprises:

producing a prioritized plurality of information segments from each of a plurality of data items which are available from said at least one data source; and providing data to said user terminal device, identifying a selected data item by a first of said prioritized information segments of said selected data item.

59. A system for customizing the delivery of information by an information server to a plurality of information recipients, wherein said information server transmits said information to information recipients who are located within a predetermined vicinity of said information server, comprising:

(a) means for automatically determining a user profile for each of plurality of potential information recipients;

(b) means for determining a population of said information recipients in said vicinity of said information server;

(c) means for determining an identity of each of said information recipients;

(d) means for determining a composite user profile for said population of information recipients utilizing said user profiles; and (e) means for delivering information that is a function of said composite user profile.

60. The system for customizing the delivery of information of claim 59 wherein said means for delivering information includes:

means for pricing delivery of said information based on bids received from information purveyors.

61. The system for customizing the delivery of information of claim 60 wherein said means for delivering information further includes:

means for providing said composite user profile to said information purveyors.

62. A method of customizing the delivery of information by an information server to a plurality of information recipients, wherein said information server transmits said information to information recipients who are located within a predetermined vicinity of said information server, comprising the steps of:

(a) determining automatically a user profile for each of said plurality of potential information recipients;

(b) determining a population of said information recipients in said vicinity of said information server;

(c) determining an identity of each of said information;

(d) determining a composite user profile for said population of information recipients; and (e) delivering information that is a function of said composite user profile.

63. The method for customizing the delivery of information of claim 62 wherein said step of delivering information includes:

pricing delivery of said information based on bids received from information purveyors.

64. The method for customizing the delivery of information of claim 63 wherein said step of delivering information further includes:

providing said composite user profile to said information purveyors.

65. A system for customizing the delivery of information by an information server to a plurality of information recipients, wherein said information server transmits said information to information recipients who are located within a predetermined vicinity of said information server, comprising:

(a) means for determining a presence of a plurality of said potential information recipients of said information in said vicinity of said information server;

(b) means for determining an identity of said potential information recipients of said information;

(c) means for modifying said information as a function of said determined identity and associated user profiles of said plurality of potential information recipients;

(d) means for displaying said information on a display system which is commonly available to said plurality of potential information recipients.

66. The system for customizing the delivery of information of claim 65 wherein said means for determining a presence comprises:

means for establishing a wireless communication connection to a user terminal device in the possession of said potential information recipients of said information in said vicinity of said information server.

67. The system for customizing the delivery of information of claim 66 wherein said means for determining a presence further comprises:

means for retrieving a location identifier from said user terminal device in the possession of said potential information recipients of said information in said vicinity of said information server, wherein said location identifier is unique to said user terminal devices.

68. The system for customizing the delivery of information of claim 67 wherein said means for determining an identity comprises:

means, responsive to said location identifier, for associating said location identifier with a user identifier that uniquely identifies said user.

69. The system for customizing the delivery of information of claim 68 wherein said means for determining an identity further comprises:

means, responsive to said use identifier, for associating said user identifier with a user profile that identifies predetermined characteristics of said user.

70. The system for customizing the delivery of information of claim 69 wherein said means for modifying said information comprises:

means, responsive to said user profiles of said information recipients who are located within a predetermined vicinity of said information server, for identifying an appropriate set of information to be displayed to said information recipients who are located within a predetermined vicinity of said information server.

71. The system for customizing the delivery of information of claim 70 wherein said means for modifying said information further comprises:

means for transmitting said identified appropriate set of information to said information recipients who are located within a predetermined vicinity of said information server.

72. The system for customizing the delivery of information of claim 65 wherein said means for determining an identity comprises:

means, responsive to determining a presence of a potential information recipient of said information in said information in said vicinity of said information server, for generating a user identifier that uniquely identifies said potential information recipient.

73. The system for customizing the delivery of information of claim 72 wherein said means for determining an identity further comprises:

means, responsive to said user identifier, for associating said user identifier with a user profile that identifies predetermined characteristics of said potential information recipient.

74. The system for customizing the delivery of information of claim 65 wherein said means for modifying said information comprises:

means, responsive to said determined identity of said potential information recipients, for identifying an appropriate set of information to be displayed to said potential information recipients.

75. The system for customizing the delivery of information of claim 74 wherein said means for modifying said information further comprises:

means for transmitting said identified appropriate set of information to said potential information recipients who are located within a predetermined vicinity of said information server.

76. The system for customizing the delivery of information of claim 66 wherein said means for modifying said information further comprises:

means for prefetching said information to said information server from at least one data source where said information is stored.

77. The system for customizing the delivery of information of claim 76 wherein said means for prefetching comprises:

means for producing a prioritized plurality of information segments from each of a plurality of data items which are available from said at least one data source; and means for providing data to said user terminal device, identifying a selected data item by a first of said prioritizing information segments of said selected data item.

78. A method for customizing the delivery of information by an information server to a plurality of information recipients, wherein said information server transmits said information to information recipients who are located within a predetermined vicinity of said information server, comprising the steps of:

(a) determining a presence of a plurality of potential information recipients of said information in said vicinity of said information server;

(b) determining an identity of said potential information recipients of said information;

(c) modifying said information as a function of said determined identity and associated user profiles of said potential information recipients; and (d) displaying said information on a display system which is commonly available to said plurality of potential information recipients.

79. The method for customizing the delivery of information of claim 78 wherein said step of determining a presence comprises:

establishing a wireless communication connection to a user terminal device in the possession of said potential information recipients of said information in said vicinity of said information server.

80. The method for customizing the delivery of information of claim 79 wherein said step of determining a presence further comprises:

retrieving a location identifier from said user terminal devices in the possession of said potential information recipients of said information in said vicinity of said information server, wherein said location identifier is unique to said user terminal device.

81. The method for customizing the delivery of information of claim 80 wherein said step of determining an identity comprises:

associating, in response to said location identifier, said location identifier with a user identifier that uniquely identifies said user.

82. The method for customizing the delivery of information of claim 81 wherein said step of determining an identity further comprises:

associating, in response to said user identifier with a user profile that identifies predetermined characteristics of said user.

83. The method for customizing the delivery of information of claim 82 wherein said step of modifying said information comprises:

identifying, in response to said user profile of said information recipients who are located within a predetermined vicinity of said information server, an appropriate set of information to be displayed to said information recipients who are located within a predetermined vicinity of said information server.

84. The method for customizing the delivery of information of claim 83 wherein said step of modifying said information further comprises:

transmitting said identified appropriate set of information to said information recipients who are located within a predetermined vicinity of said information server.

85. The method for customizing the delivery of information of claim 78 wherein said step of determining an identity comprises:

generating, in response to determining a presence of a potential information recipient of said information in said vicinity of said information server, a user identifier that uniquely identifies said potential information recipient.

86. The method of customizing the delivery of information of claim 85 wherein said step of determining an identity further comprises:

associating, in response to said user identifier, said user identifier with a user profile that identifies predetermined characteristic of said potential information recipient.

87. The method for customizing the delivery of information of claim 78 wherein said step of modifying said information comprises:

identifying, in response to said determined identity of said potential information recipients, an appropriate set of information to be displayed to said potential information recipients.

88. The method of customizing the delivery of information of claim 87 wherein said step of modifying said information further comprises:

transmitting said identified appropriate set of information to said potential information recipients who are located within a predetermined vicinity of said information server.

89. The method for customizing the delivery of information of claim 79 wherein said step of modifying said information further comprises:

prefetching said information to said information server from at least one data source where said information is stored.

90. The method for customizing the delivery of information of claim 89 wherein said step of prefetching comprises:

producing a prioritized plurality of information segments from each of a plurality of data items which are available from said at least one data source; and providing data to said user terminal device, identifying a selected data item by a first of said prioritized information segments of said selected data item.

91. A system for customizing the delivery of information by an information server to a plurality of information recipients, wherein said information server transmits said information to information recipients who are located within a predetermined vicinity of said information server, comprising:

(a) means for determining a population of said information recipients in said vicinity of said information server;

(b) means for determining an identity of each of said information recipients;

(c) means for determining a composite user profile for said population of information recipients utilizing said user profiles; and (d) means for delivering information that is a function of said composite user profile; and (e) means for displaying said information on a display system which is commonly available to said plurality of potential information recipients.

92. The system for customizing the delivery of information of claim 91 wherein said means for delivering information includes:

means for pricing delivery of said information based on bids received from information purveyors.

93. The system for customizing the delivery of information of claim 92 wherein said means for delivering information further includes:

means for providing said composite user profile to said information purveyors.

94. A method of customizing the delivery of information by an information server to a plurality of information recipients, wherein said information server transmits said information to information recipients who are located within a predetermined vicinity of said information server, comprising the steps of:

(a) determining a population of said information recipients in said vicinity of said information server;

(b) determining an identity of each of said information;

(c) determining a composite user profile for said population of information recipients;

(d) delivering information that is a function of said composite user profile; and (e) displaying said information on a display system which is commonly available to said plurality of potential information recipients.

95. The method for customizing the delivery of information of claim 94 wherein said step of delivering information includes:

pricing delivery of said information based on bids received from information purveyors.

96. The method for customizing the delivery of information of claim 95 wherein said step of delivering information further includes:

providing said composite user profile to said information purveyors.

* * * * *